(12) United States Patent
Gotoh et al.

(10) Patent No.: US 6,847,424 B2
(45) Date of Patent: Jan. 25, 2005

(54) LIQUID-CRYSTAL DISPLAY AND A LIGHTING APPARATUS

(75) Inventors: Takeshi Gotoh, Kawasaki (JP); Tetsuya Hamada, Kawasaki (JP); Tetsuya Kobayashi, Kawasaki (JP); Keiji Hayashi, Kawasaki (JP); Toshihiro Suzuki, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 175 days.

(21) Appl. No.: 09/938,183

(22) Filed: Aug. 23, 2001

(65) Prior Publication Data
US 2002/0154256 A1 Oct. 24, 2002

(30) Foreign Application Priority Data
Feb. 9, 2001 (JP) .................................... 2001-034713

(51) Int. Cl.[7] ............................................. G02F 1/1335
(52) U.S. Cl. ..................... 349/113; 349/61; 349/63; 349/137
(58) Field of Search ................................. 349/113, 117, 349/61, 63, 137

(56) References Cited

U.S. PATENT DOCUMENTS

| | | | | |
|---|---|---|---|---|
| 5,808,708 A | * | 9/1998 | Oyama et al. | 349/65 |
| 6,147,725 A | * | 11/2000 | Yuuki et al. | 349/65 |
| 6,199,995 B1 | * | 3/2001 | Umemoto et al. | 362/31 |
| 6,266,108 B1 | * | 7/2001 | Bao et al. | 349/63 |
| 6,288,760 B1 | * | 9/2001 | Sawayama | 349/63 |
| 6,340,999 B1 | * | 1/2002 | Masuda et al. | 349/63 |
| 6,435,687 B1 | * | 8/2002 | Fukiharu | 362/31 |
| 6,494,585 B1 | * | 12/2002 | Wada | 362/26 |
| 6,507,378 B1 | * | 1/2003 | Yano et al. | 349/63 |
| 6,577,359 B2 | * | 6/2003 | Ishihara et al. | 349/63 |
| 2001/0012158 A1 | * | 8/2001 | Umemoto et al. | 359/599 |
| 2001/0017678 A1 | * | 8/2001 | Kobayashi | 349/106 |
| 2001/0019379 A1 | * | 9/2001 | Ishihara et al. | 349/65 |
| 2001/0024253 A1 | * | 9/2001 | Ishihara | 349/113 |

FOREIGN PATENT DOCUMENTS

| | | | |
|---|---|---|---|
| JP | 05-034730 | | 2/1993 |
| JP | 5-158033 | | 6/1993 |
| JP | 05-181134 | | 7/1993 |
| JP | 05-196923 | | 8/1993 |
| JP | 5-297366 | * | 11/1993 |
| JP | 06-102402 | | 4/1994 |
| JP | 06-130229 | | 5/1994 |
| JP | 06-160843 | | 6/1994 |
| JP | 06-194525 | | 7/1994 |
| JP | 07-209641 | | 8/1995 |
| JP | 8-220345 | * | 8/1996 |
| JP | 10-3813 | * | 1/1998 |
| JP | 10-268308 | | 10/1998 |
| JP | 10-326515 | * | 12/1998 |
| JP | 2000-180836 | | 6/2000 |

* cited by examiner

*Primary Examiner*—Nathan J. Flynn
*Assistant Examiner*—Ahmed N. Sefer
(74) *Attorney, Agent, or Firm*—Greer, Burns & Crain, Ltd.

(57) ABSTRACT

A liquid-crystal display includes a reflective liquid-crystal panel, a light guiding plate disposed on the reflective liquid-crystal panel, a polarizer arranged between a liquid-crystal layer of the reflective liquid-crystal panel and the light guiding plate, and a light source disposed on a side surface of the light guiding plate. Light emitted from the light source propagates through the light guiding plate and has a primary direction. A smaller one of two angles between a projection of the primary direction onto the reflective liquid-crystal panel and an absorption axis of the light guiding plate is at least 50°. This resultantly improves performance of the liquid-crystal display.

6 Claims, 28 Drawing Sheets

F I G. 3
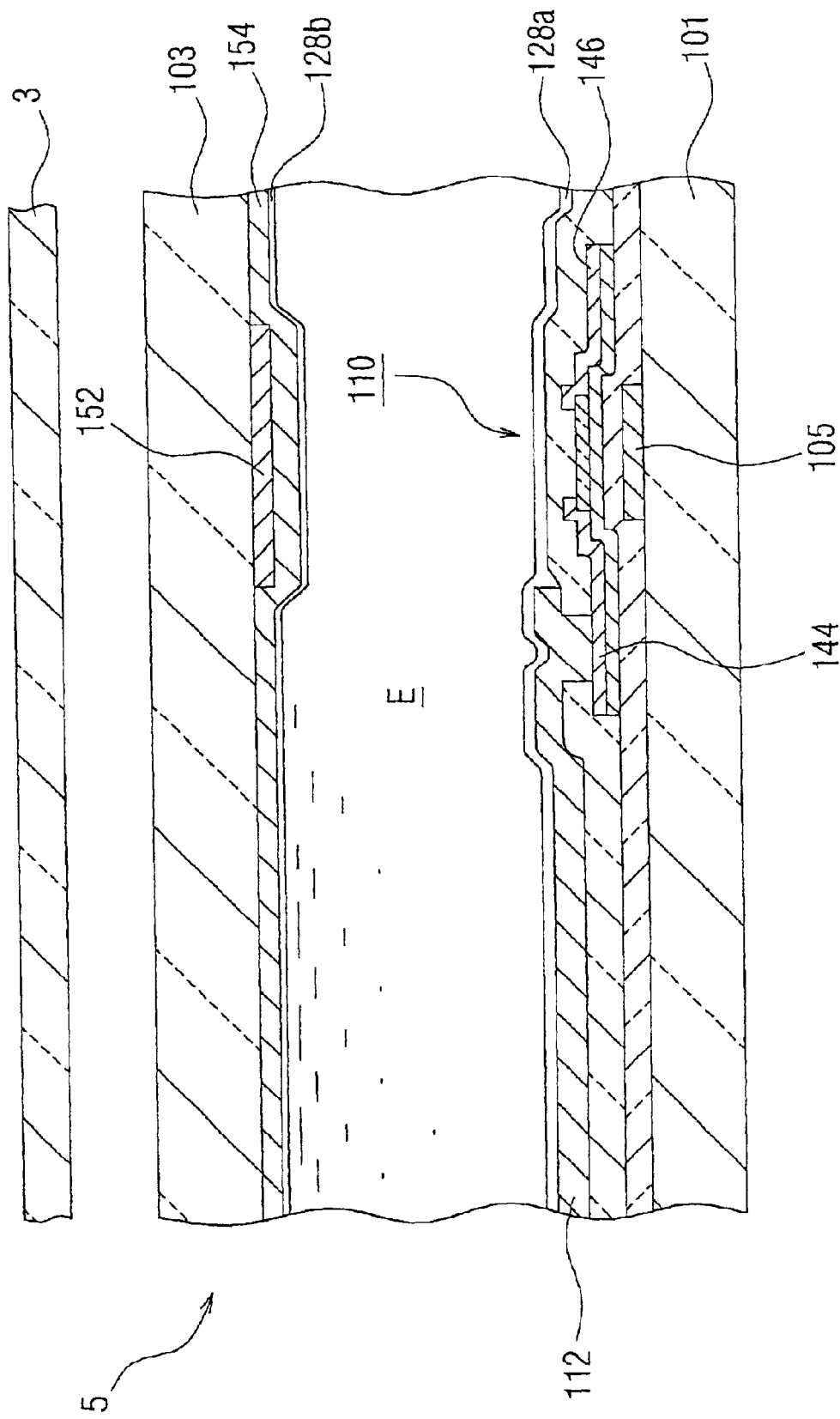

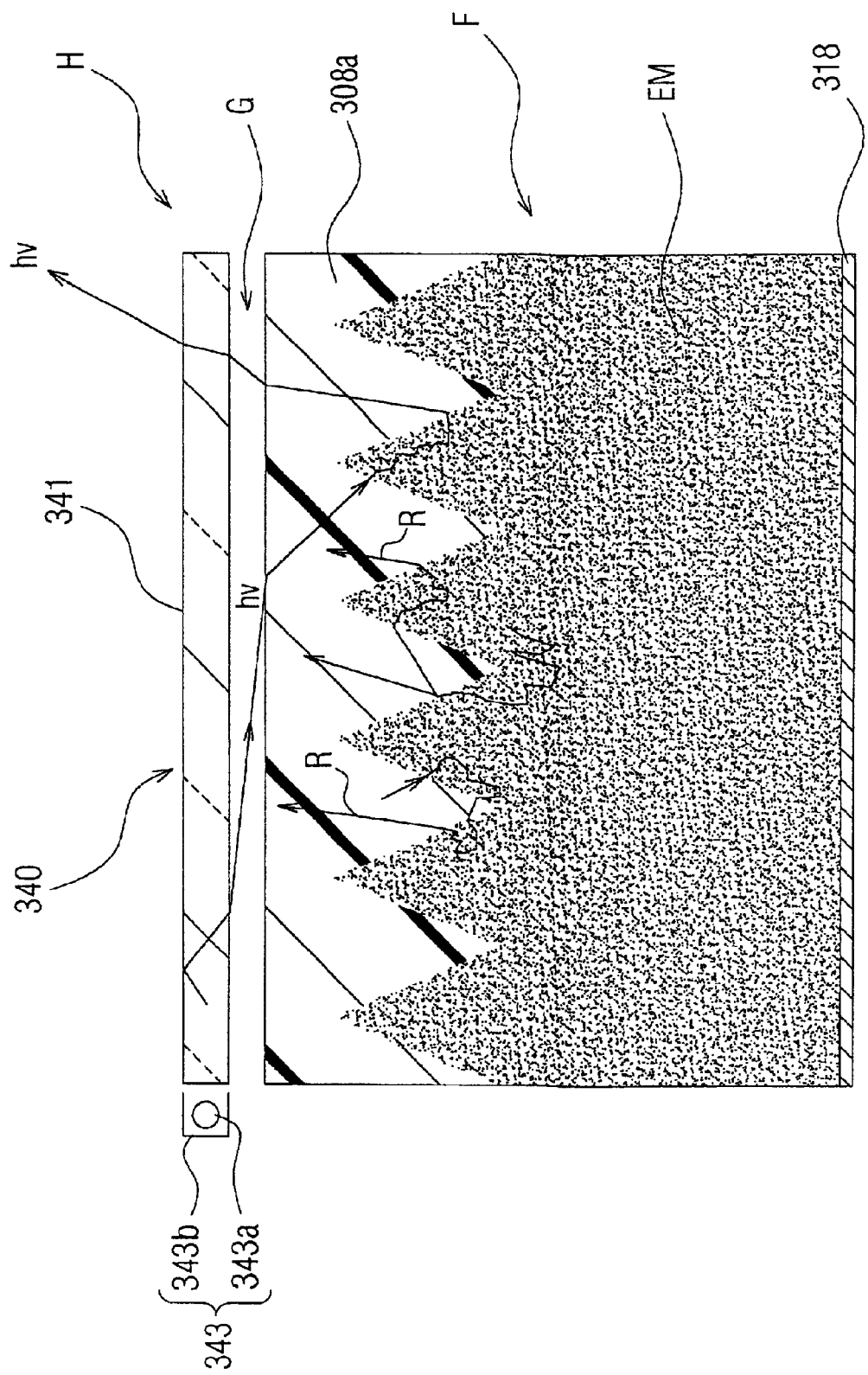

LIQUID-CRYSTAL DISPLAY AND A LIGHTING APPARATUS

This application is based on Japanese Patent Application 2001-034713, filed on February 9, all the content of which is incorporated in this application by reference.

BACKGROUND OF THE INVENTION

1. Field of the Invention

The present invention relates to a liquid-crystal display (LCD), and in particular, to a reflective liquid-crystal display.

2. Description of the Related Art

Recent development of notebook-sized personal computers, portable telephones, and the like has spurred research and development of a reflective liquid-crystal display. The liquid-crystal display of this type does not require any subordinate lighting apparatus when used, for example, outdoors. Additionally, the display is quite suitably used with complementary metal-oxide semiconductors (CMOS). Therefore, power consumption of the display can be easily reduced. The reflective liquid-crystal display is highly promising in consideration of the protection of the environments of the earth.

In general, a lightguide or guiding plate is used to illuminate a reflective liquid-crystal panel. Particularly, in a reflective liquid-crystal panel of a side light type in which a light source is disposed at an edge surface of the light guiding plate to guide light into the light guiding plate, it is possible to reduce thickness and power consumption thereof.

The liquid-crystal panels used for reflective liquid-crystal displays mainly include, for example, a liquid-crystal panel which uses a guest host liquid crystal produced by adding dichroic dye to a phase-transition liquid crystal using cholesteric nematic phase transition and in which light absorption and light transmission are conducted according to changes of alignment in the dye. Moreover, there are employed a liquid-crystal panel of polymer-dispersion-type liquid crystal (PDLC) type using PDLC as well as a liquid-crystal panel in which a liquid crystal of phase modulation type such as a liquid crystal of an electric-field-controlled birefringence (ECB) type, super twisted-nematic (TN) type, or a TN-type is used in combination with a polarizer.

SUMMARY OF THE INVENTION

Among the liquid-crystal panels above, the panel of PDLC type can display bright letters and images because it does not use a polarizer. However, the panel of this type is attended with a problem of loss in a process of scattering of light. On the other hand, the panel using a polarizer in combination with a liquid crystal is attended with a problem that luminance is lowered by the presence of the polarizer.

It is therefore an object of the present invention to provide a liquid-crystal display of PDLC or a liquid-crystal display using a polarizer in combination with a liquid crystal in which luminance is improved and a lighting apparatus suitable for use with a liquid-crystal display.

According to one aspect of the present invention, there is provided a reflective liquid-crystal display, comprising a reflective liquid-crystal panel; a light guiding plate disposed on said reflective liquid-crystal panel; a polarizer disposed between said reflective liquid-crystal panel and said light guiding plate; and a light source disposed on a side surface of said light guiding plate, wherein light emitted from said light source propagates through said light guiding plate, the light having a primary direction; and a smaller one of two angles between a projection of the primary direction onto said reflective liquid-crystal panel and an absorption axis of said light guiding plate is at least 50°.

In these reflective liquid-crystal displays, the p-polarized light of the polarized light emitted form the light guiding plate to the polarizer can be selectively emitted from the polarizer. Since the p-polarized light has high intensity, it is possible to increase the intensity of light fed from the polarizer to the liquid-crystal panel.

BRIEF DESCRIPTION OF THE DRAWINGS

The objects and features of the present invention will become more apparent from the consideration of the following detailed description taken in conjunction with the accompanying drawings in which:

FIG. 2C is a side view showing structure of the reflective liquid-crystal display viewed from;

FIG. 3 is a cross-sectional view showing structure of a liquid-crystal panel of the reflective liquid-crystal display;

FIG. 22 is a diagram showing overall structure of a display using a reflective liquid-crystal display of the first and second embodiments of the fourth embodiment;

DETAILED DESCRIPTION OF THE EMBODIMENTS

In this specification, when light is emitted from a light guiding plate or when light enters a polarizer, light vibrating in a plane in which the incident light and a normal of the light guiding plate exist is called "p-polarized light (p for parallel) and light vibrating a in a plane vertical to the plane of p-polarized light is called s-polarized light (s for senkrecht in German=orthogonal in English).

Figure 1A:
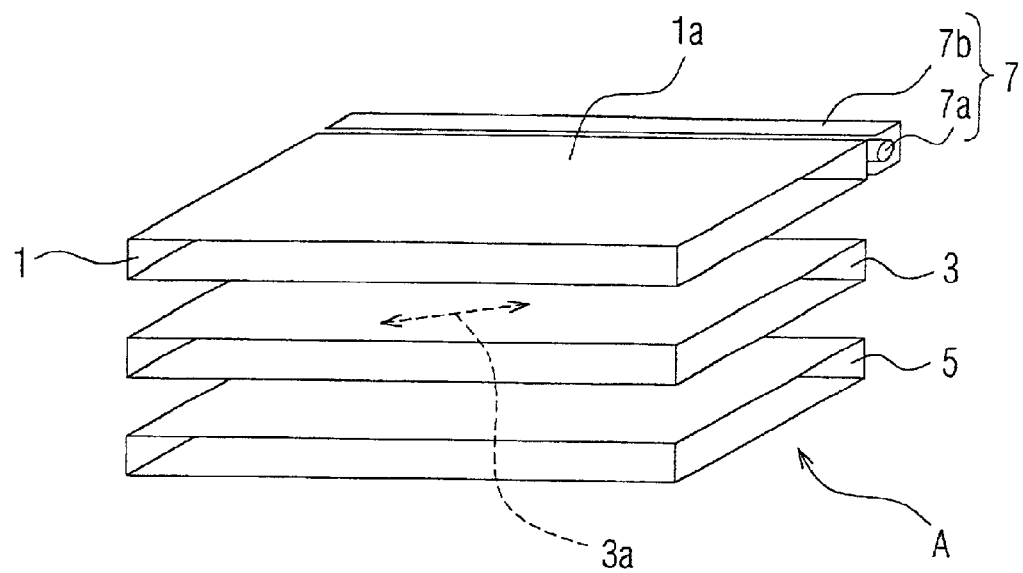
FIG. 1A is a perspective view showing a reflective liquid-crystal display of a polarizer combination type.

FIG. 1A shows a general construction of a reflective liquid-crystal display A using a configuration of a polarizer combination type in a perspective view.

As shown in FIG. 1A, the display A includes a light guiding plate 1 to emit light as front-light to illuminate a liquid-crystal panel, a polarizer 3, and a liquid-crystal panel 5. Light emitted from the light guiding plate 1 passes through the polarizer 3 and enters the liquid-crystal panel 5.

The inventor has analyzed characteristics of light emitted from the light guiding plate 1 and light incident to the polarizer 3 in the reflective liquid-crystal display A and has found that the light is polarized to some extent.

When a polarizer is arranged between a light guiding plate and a liquid-crystal panel, p-polarized or s-polarized light can be selectively passed through the polarizer using a positional relationship between the vibrating direction of the light and a transmission axis of the polarizer. In other words, s-polarized or p-polarized light can be selectively absorbed by the polarizer. For example, when the light vibration direction of p-polarized substantially matches the transmission axis direction of the polarizer, the p-polarized light can be selectively passed therethrough. This selective passing of light can also be applied to the s-polarized light.

Figure 1B:
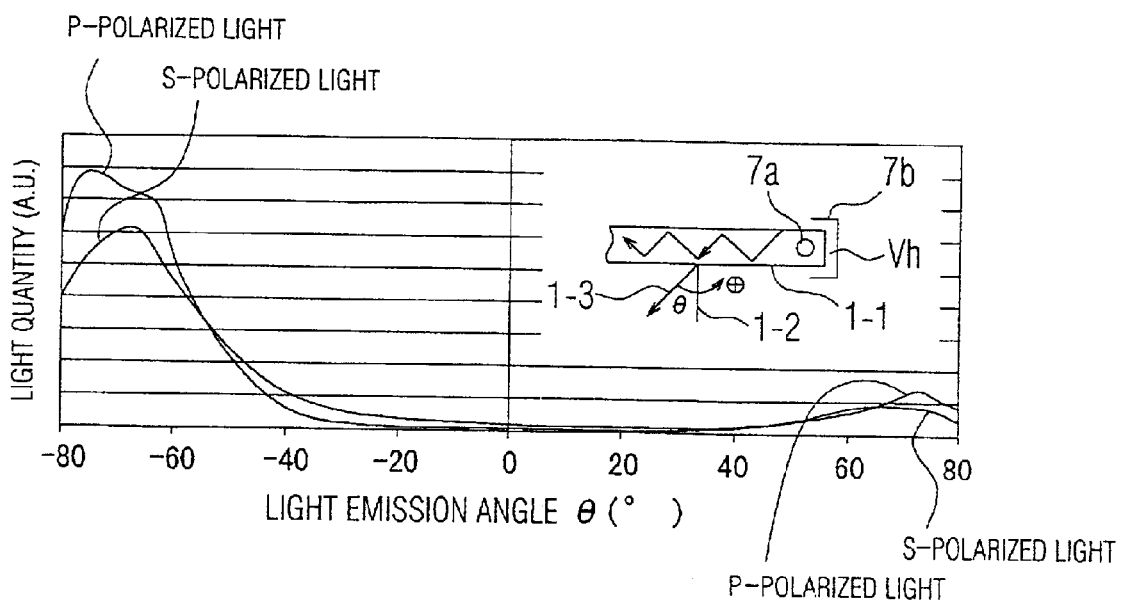
FIG. 1B is a graph sowing a relationship between a direction of polarization and a quantity of light emitted from a light guiding plate.

FIG. 1B shows a relationship between a direction of polarized light and light quantity of light emitted from the polarizer. The ordinate represents light intensity in a desired unit. The abscissa represents an angle $\theta$ of emission (alignment angle) of light emitted from the light guiding plate.

The emission angle $\theta$ is an angle between emission light 1-3 and a normal 1-2 of an emission plane 1-1 of a light guiding plate 1. In a plane including the normal 1-2 and the light guiding plate 1, the angle increases (plus) in the counterclockwise direction relative to the normal 1-2 and decreases (minus) in the clockwise direction relative thereto. That is, assume that a light source 7a is placed on an edge surface of the right end of the light guiding plate 1 as shown in FIG. 1A. When the light guiding plate 1 is viewed from a side surface, light from the light source 7a propagates therethrough in a direction (from the right to the left in FIG. 1A) as indicated by an arrow. When the emission light 1-3 is emitted from a rear surface (emission surface 1-1), if the emission light 1-3 has an angle $\theta$ in the counterclockwise direction relative to the normal 1-2, $\theta$ is positive (plus). If the emission light 1-3 has an angle $\theta$ in the clockwise direction relative to the normal 1-2, $\theta$ is negative (minus). For example, the angle $\theta$ in FIG. 1B is minus and has a negative value.

Of the light which is emitted from the light source 7a and which propagates through the light guiding plate 1, light emitted from the rear surface (lower surface) of the light guiding plate 1 primarily includes light which goes away from the light source 7a. In FIG. 1B including the light guiding plate 1 and the light source 7a, if the light source 7a is placed on the left corner of FIG. 1B, the plus and minus signs of the angle $\theta$ will be exchanged.

As can be seen from FIG. 1B, each of the polarized components, namely, p-polarized light and s-polarized light has a considerably broad distribution of angles when they are emitted from the light guiding plate 7. It is found that the s-polarized light has a big peak of intensity of light at an alignment angle $\theta$ of about −65°. On the other hand, the p-polarized light has a big peak of intensity of light at an alignment angle $\theta$ of about −72°. Specifically, the peak light intensity of p-polarized light is about 20% higher than that of the s-polarized light. Comparing the relative light intensity between the p-polarized light and the s-polarized light, the p-polarized light is stronger in an alignment angle range from about −80° to about −52°. The s-polarized light is stronger in an alignment angle range from about −52° to about −10°.

In general, when light is emitted from the light guiding plate, if the light passes an incidence/emission surface as p-polarized light, its amount of light is large. If the light passes an incidence/emission surface as s-polarized light, the amount of light is small. However, when light is emitted from the light guiding plate and when light enters the light guiding plate, the light which passes the incidence and emission surfaces as s-polarized light includes a larger component emitted in a direction near a vertical direction with respect to a surface of the light guiding plate (θ is small) when compared with the light which passes the incidence and emission surfaces as p-polarized light.

Referring more precisely to FIG. 1B, it is first recognized that in an emission angle range from −52° to −80°, the p-polarized light is stronger in light intensity than the s-polarized light. Second, in an emission angle range from at least −10° to −52°, the s-polarized light is stronger in light intensity than the p-polarized light. Naturally, the angles slightly vary depending on material and structure of the light guiding plate. However, its qualitative tendency is kept unchanged. That is, this tendency similarly appears in a front-light system in a mode in which light is emitted from the light guiding plate by simple scattering using embodiment and/or diffusion beads and in a mode in which light is emitted from the light guiding plate by inclining a catadioptric plane of a surface of the light guiding plate.

Using the characteristic of the light emitted from a light guiding plate, when a polarizer is placed between the light guiding plate and a liquid-crystal panel, light primarily including s-polarized light and light primarily including p-polarized light can be selectively obtained by adjusting an angle between a direction of the light emitted from the light guiding plate and an absorption axis (transmission axis) of the polarizer. Luminance of the light can also be increased.

Based on the consideration, description will be given of a reflective liquid-crystal display in a first embodiment of the present invention by referring to FIGS. 2A, 2B, 2C, and 3.

Figure 2A:
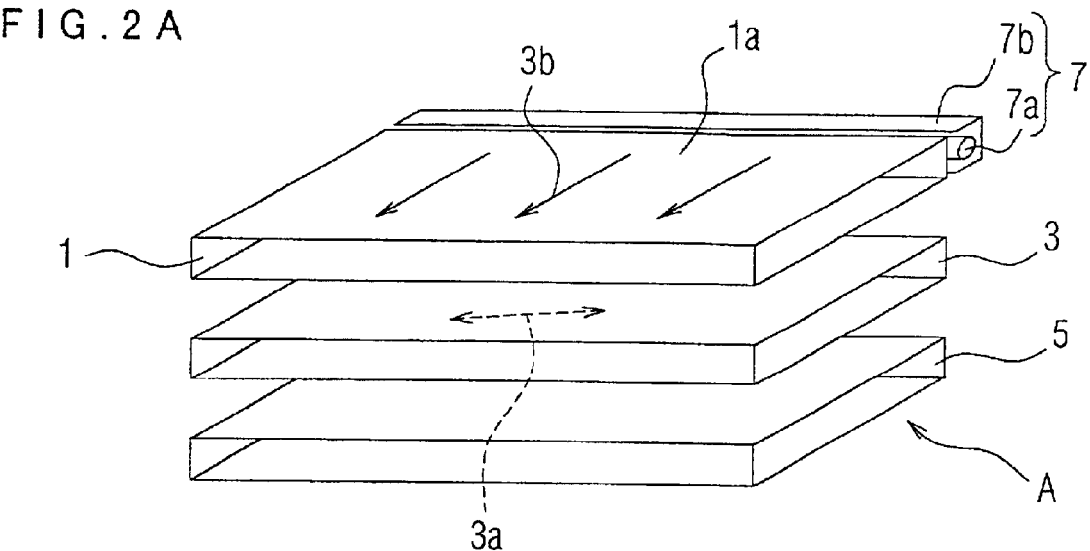
FIG. 2A is a perspective view showing a reflective liquid-crystal display in a first embodiment of the present invention.
Figure 2B:
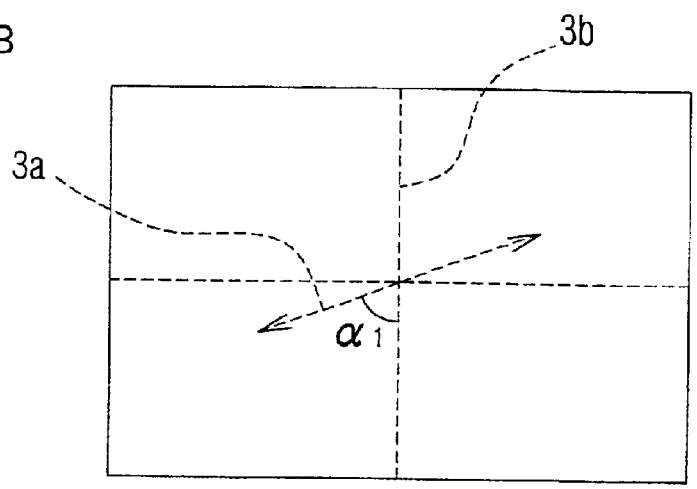
FIG. 2B is a graph showing a positional relationship between an absorption axis of a polarizer and a projection of light incident to the polarizer when the reflective liquid-crystal display is viewed from a point above the display.
Figure 2C:
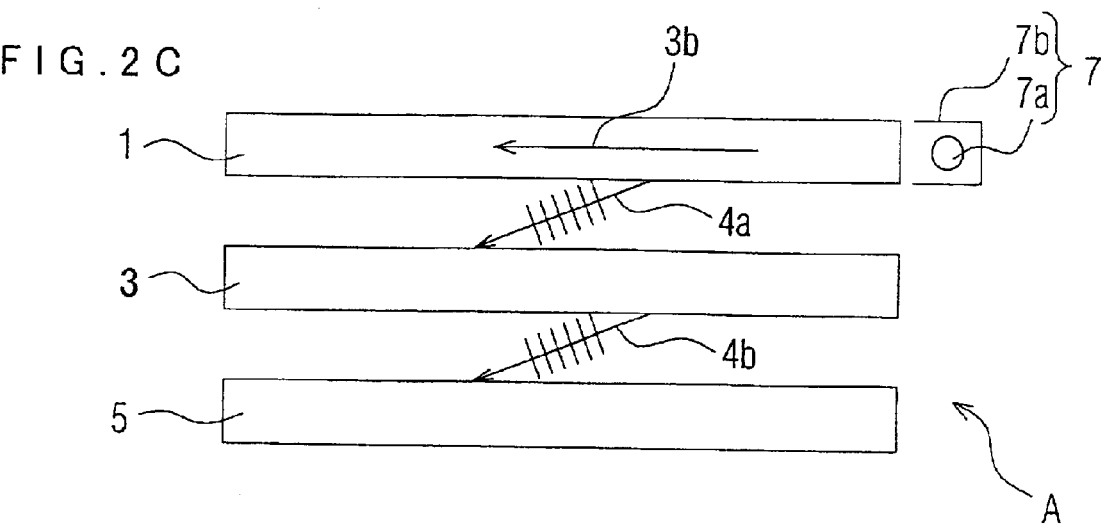

FIG. 2A is a perspective view showing an overall configuration of the reflective liquid-crystal display. FIG. 2B shows in a graph a positional relationship between an absorption axis (orthogonal to the transmission axis) of the polarizer and a projected image or a projection on the polarizer of a primary propagation direction of light incident to the polarizer when the display is viewed from above. FIG. 2C shows the configuration of the display when viewed from a side thereof. FIG. 3 is a cross-sectional view showing structure of a liquid-crystal panel.

As shown in FIG. 2A, the reflective liquid-crystal display A includes a light guiding plate 1, a polarizer 3, and a liquid-crystal panel 5 configured in this order in a downward direction. In FIG. 2A, the light guiding plate 1, the polarizer 3, and the liquid-crystal panel 5 seem to be separated from each other. However, actually, these components are arranged to be closely fixed to each other. Disposed on an edge surface of the light guiding plate 1 is a front lighting device 7. The device 7 includes a cold-cathode tube 7a as a light source and a reflector 7b which reflects light from the tube 7a to collect the light on the edge surface.

Next, description will be given of the configuration of the liquid-crystal panel 5. FIG. 3 shows a cross section of substantially one pixel of the panel 5.

As can be seen from FIG. 3, the liquid-crystal panel 5 includes a first transparent glass substrate 101 and a second transparent glass substrate 103. Both substrate 101 and 103 are arranged parallel to each other and oppose to each other with a predetermined distance therebetween.

A space between the substrates 101 and 103 is filled with liquid-crystal material E. Formed on the first glass substrate is, for example, a thin-film transistor (TFT) 110.

A gate electrode 105 of the transistor 110 is connected to a scanning line of the liquid-crystal panel 5. A drain electrode 146 of the transistor 110 is connected to a signal line of the panel 5. A source electrode 144 of the transistor 110 is connected to a reflection electrode (pixel electrode) 112. An alignment layer 128a is formed on an entire pixel region including the reflection electrode 112.

On the second glass substrate 103 (on a lower surface thereof in FIG. 3), a transparent common electrode 103 is formed. On the electrode 103 (on a lower surface thereof), an alignment layer 128b is formed. A light shielding film 152 is formed on the second glass substrate 103 to cover the transistor 110.

Light externally incident to the second substrate 103 reflects on the reflection electrode 112. When a signal voltage is applied across the reflection electrode 112 and the common electrode 154, alignment of the liquid-crystal material changes in response to the signal. When intensity of the reflected light appropriately changes, liquid-crystal display can be achieved. Outside the second glass substrate 103 (the side opposite to the first glass substrate 101), a polarizer 3 and a light guiding plate 1 (FIGS. 1A and 2C) are disposed with predetermined distances respectively from the second glass substrate 103.

Observing the liquid-crystal panel 5 through the polarizer 3 and the light guiding plate 1 (FIG. 2) from the side of the second glass substrate 103, white/black display can be recognized (when a color filter is formed between the second glass substrate 103 and the common electrode 154, color display can be recognized).

In this connection, also in reflective liquid-crystal displays in first to fourth embodiments described below, it is only necessary to use a liquid-crystal panel of a configuration used in the reflective liquid-crystal display of the embodiment above.

Referring again to FIGS. 1A to 2C, the overall configuration of the reflective liquid-crystal display will be continuously described. On an upper surface of the light guiding plate 1, a diffusion sheet 1a is fixedly arranged. The sheet 1a is a sheet of weak diffusion, namely, with a Hayes value of about three. By using the diffusion sheet 1a for weak diffusion, it is possible to prevent deterioration of resolution obtained when viewed the liquid-crystal panel 5 through the light guiding plate 1.

To match the liquid-crystal panel 5 with visual characteristics, an angle α1 between an absorption angle 3a of the polarizer 3 and a projected image 3b onto the polarizer 3 of light incident to the polarizer 3 is set to, for example, 80°. That is, the polarizer 3 is arranged to have an absorption axis shifted 10° from a direction almost orthogonal to the light propagation direction, more correctly, from a longitudinal direction (along the length) of the cold-cathode tube 7a. To increase the amount of light, it is desired to match the primary direction of light propagation with the direction of the transmission axis of the polarizer 3, that is, to minimize the difference between α1 and 90°. However, actually, α1 is set to about 80° in many cases as shown in FIG. 2B because of various situations such as a relationship with the liquid-crystal panel. In this connection, the desired advantage can be fully obtained when the angle α1 is in a range from about 50° to about 90°.

Since the polarizer 3 is installed such that the absorption axis of the polarizer 3 is aligned to a direction almost vertical to the light propagation direction (primary direction 3b), the primary direction of propagation of light is substantially equal to the direction of the transmission axis of the polarizer 3. Therefore, p-polarized light 4a having a polarized light component 4b in the plane of incidence of light selectively passes through the polarizer 3. Consequently, a large amount of p-polarized light 4a enters the liquid-crystal panel 5. In this case, a projected image of the direction of p-polarized light 4a onto the polarizer 3 substantially matches with the direction of the transmission axis of the polarizer 3.

In the reflective liquid-crystal display A, the amount of light is increased when compared with general reflective liquid-crystal displays. Specifically, when α1 is set to 45°, luminance of the display A is about 8% increased as compared with that of a similarly constructed reflective liquid-crystal display.

In this situation, it is not required to completely match the direction of the projected image of the primary propagation direction of light with the direction of the transmission axis of the liquid-crystal panel. When a shift of angle appears between the transmission axis and the p-polarized light, transmittance of the p-polarized light is reduced. However, in a general configuration of a polarizer, the transmittance of p-polarized light component is about 50%. Additionally, for example, when the projected image of the primary direction of propagation of light shifts 40° from the transmission axis of the liquid-crystal panel, at least 76% of the p-polarized light component passes through the liquid-crystal panel. It consequently leads to an advantage of improvement of luminance of the liquid-crystal panel.

As a result of experiments conducted by the inventor, it has been detected that light emitted from the light guiding plate as shown in FIG. 1B, particularly, light primarily including p-polarized light is light considerably inclined toward a direction parallel to the longitudinal direction (light having a large value of θ). This phenomenon has been regarded as inevitable in a liquid-crystal display of a type in which light is introduced via a light guiding plate.

Therefore, to increase the amount of light emitted therefrom, it is required to increase power supplied to the light emission tube. However, when the power is increased, the amount of light with a large angle of incidence, that is, considerably inclined light is also increased. Therefore, contrast cannot be improved in displayed images.

Figure 4A:
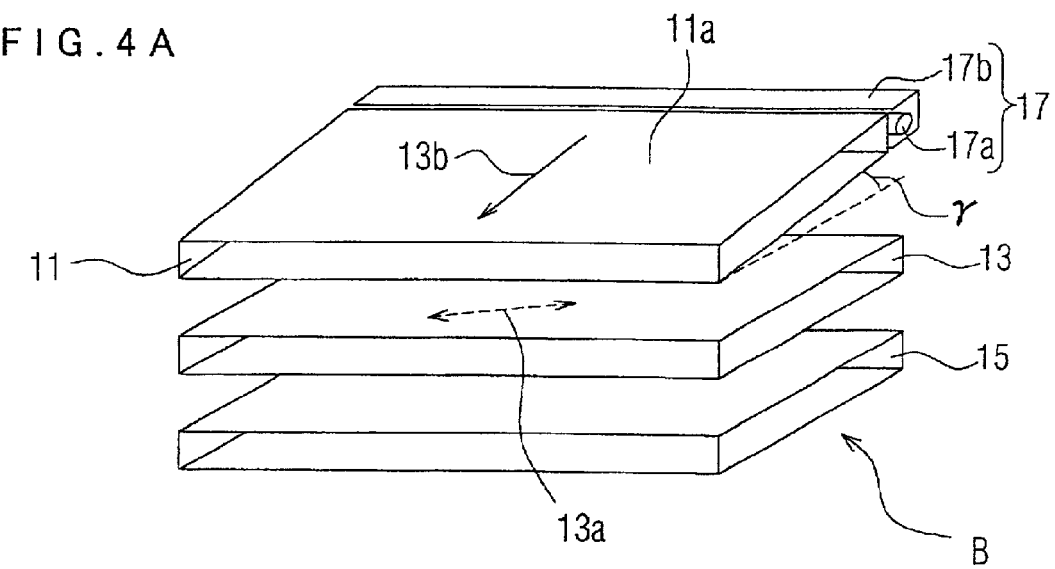
FIG. 4A is a perspective view, corresponding to FIG. 2, showing a reflective liquid-crystal display in a first variation of the first embodiment of the present invention.
Figure 4B:
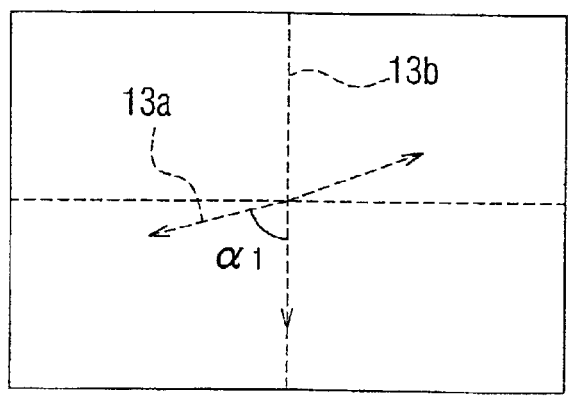
FIGS. 4B and 4C respectively correspond to FIGS. 2B and 2C.
Figure 4C:
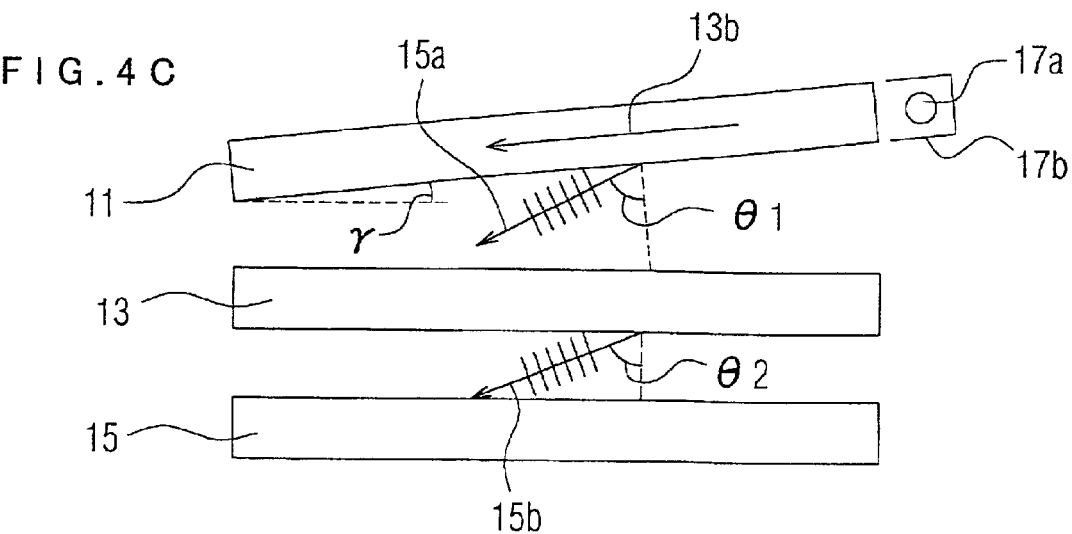
Figure 5:
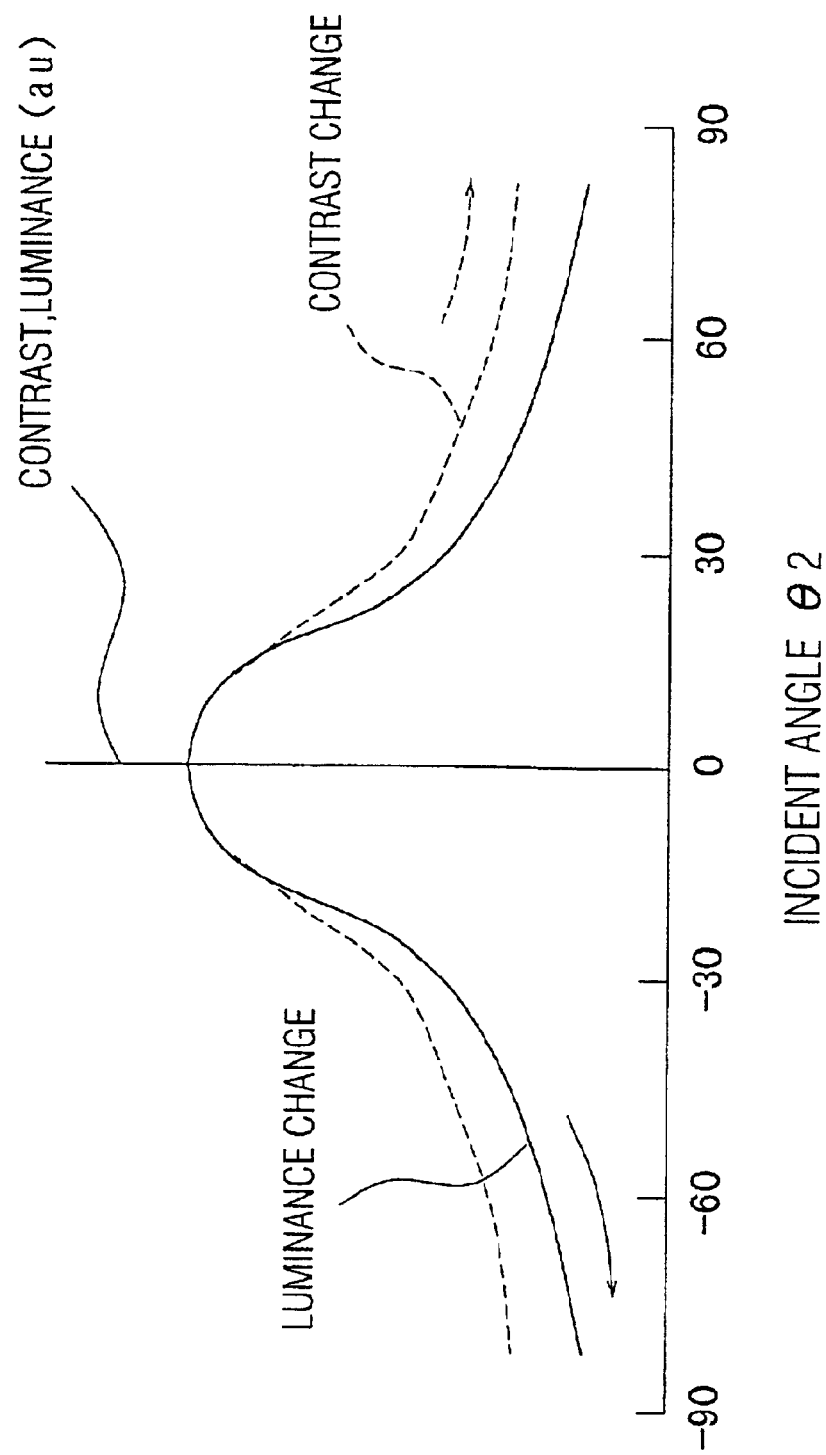
FIG. 5 is a graph showing a relationship between an incident angle, luminance, and contrast of light incident to the reflective liquid-crystal display.

In consideration of the results, description will be given of a variation of the first embodiment of the reflective liquid-crystal display by referring to FIGS. 4A to 4C and FIG. 5. FIGS. 4A to 4C correspond to FIGS. 1A to 2C. FIG. 5 shows a relationship between an angle of incidence of light, orthogonal luminance, and contrast. "Orthogonal luminance" means luminance obtained when display images are orthogonally viewed.

In FIGS. 4A to 4C, the same constituent components as those of FIGS. 2A to 2C are assigned with reference numerals obtain by adding 10 to those used in FIGS. 2A to 2C, and detailed description thereof will be avoided.

As shown in FIGS. 4A to 4C, the reflective liquid-crystal display B includes a light guiding plate 11 and a liquid crystal panel 15 inclined by an angle of γ relative to the light guiding plate 11. In the construction, the light guiding plate 11 is inclined in a direction in which the distance between a light source 17a and a polarizer 13 increases. The polarizer 13 and the liquid-crystal panel 15 are disposed to be substantially parallel to each other.

As can be seen from FIG. 4B, in the variation of the reflective liquid-crystal display, an angle α2 between an absorption axis 13a of the polarizer 13 and a direction (projection) 13b of polarized light with a large amount of light incident to the polarizer 13 is set to, for example, 80° as in the first embodiment of the reflective liquid-crystal display. The value of α2 preferably ranges from 50° to 90°.

Also in the second embodiment of the reflective liquid-crystal display B, light propagating from the polarizer 11 to the liquid-crystal panel 15 primarily includes p-polarized light, namely, light propagating in a direction similar to a direction parallel to, not vertical to, an associated surface of the polarizer 11.

The liquid-crystal panel 15 is configured in general to have reflective characteristics in which when light orthogonally enters a surface of the liquid-crystal panel 15, maximum values are obtained for its reflection factor and contrast. Therefore, it is desired that the light is incident almost orthogonally (with a small value of θ) to the liquid-crystal panel 15.

FIG. 5 shows an outline of relationship between an angle of incidence of light, luminance, and contrast in a reflective liquid-crystal panel. As can be seen from FIG. 5, when an angle θ2 of incidence of light to the liquid crystal panel (reference is made to FIG. 4C; angle relative to a normal of a surface of the liquid-crystal panel) increases, luminance and contrast of images decrease when viewed orthogonal.

To cope with the difficulty, the reflective liquid-crystal display B in this embodiment is configured such that the light guiding plate 11 is inclined only by an angle γ=10° relative to a plane parallel to the surface of the liquid-crystal panel 15 as shown in FIG. 4C. The angle θ2 of incidence of light incident to the panel 15 is substantially equal to a value obtained by subtracting the inclination angle γ from the alignment angle θ1 (namely, an angle of light emitted from the light guiding plate 11).

Provision of the inclination angle γ minimizes the angle θ2 of light incident to the panel 15 (that is, the direction of the angle becomes similar to that of the normal of the surface of the polarizer 13). This resultantly prevents the reduction of contrast.

However, when the value of angle γ becomes greater, displayed images may be unnatural for the viewer in some cases. Therefore, the inclination angle is favorably at most 45°.

As shown in 4C, the angle θ2 of incidence of light incident to the liquid-crystal panel 15 becomes smaller. Without increasing power consumption, the reduction of contrast of the reflective liquid-crystal display can be suppressed while increasing luminance thereof.

FIGS. 6A to 6G shows an example of a general configuration of a notebook-sized personal computer using the first variation of the first embodiment of the reflective liquid-crystal display.

Figure 6A:
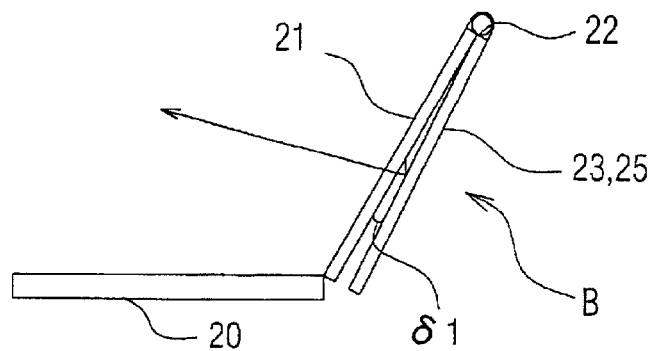
FIGS. 6A to 6D are diagrams showing structure of the reflective liquid-crystal display in the configuration of the first embodiment applied to a notebook-sized personal computer (PC)

The notebook-sized personal computer shown in FIG. 6A includes a body thereof and a lid including a reflective liquid-crystal display B. In the configuration of FIG. 6A, a light guiding plate 21, a polarizer 23, and a liquid-crystal panel 25 are rotably attached onto a rotary axis or shaft 22 disposed apart from the body 20. Therefore, there can be formed a predetermined angle δ1 between the light guiding plate 21 and the polarizer 23 and the liquid-crystal panel 25. It is only necessary that the angle δ1 is set to an angle almost equal to the angle γ shown in FIG. 4A.

Figure 6B:
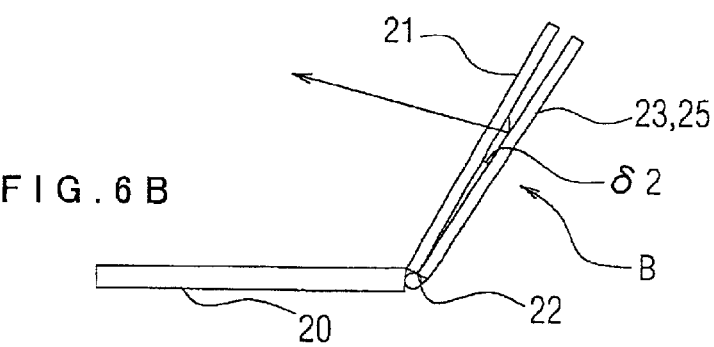
Figure 6C:
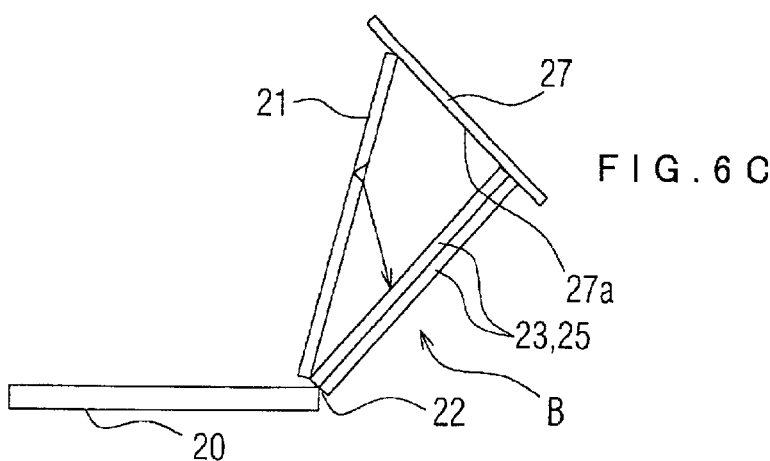
Figure 6D:
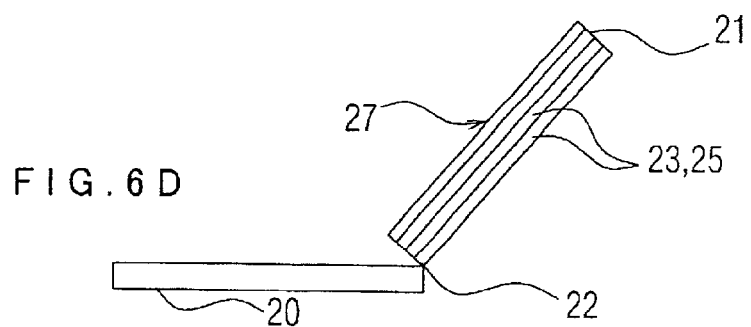

In the notebook-sized personal computer shown in FIG. 6B, the rotary shaft 22 is disposed in the vicinity of a section in which the body is coupled with the reflective liquid-crystal display. Also in the personal computer, there can be formed a predetermined angle δ2 between the light guiding plate 21 and the polarizer 23 and the liquid-crystal panel 25. It is only necessary that the angle δ2 is almost equal to the angle γ shown in FIG. 4A. FIGS. 6C and 6D show another example of application of the notebook-sized personal computer. The personal computer includes a protection cover 27. As can be seen from FIG. 6C, when the light guiding plate 21 is tilted toward the polarizer 23 and liquid-crystal panel 25, a rear surface 27a of the protection cover 27 is brought into contact with respective end sections of the light guiding plate 21, the polarizer 23, and liquid-crystal panel 25.

As shown in FIG. 6D, when the polarizer 23 and liquid-crystal panel 25 are closely fixed onto the light guiding plate 21, an associated surface of the light guiding plate 21 is covered with the protection cover 27 to resultantly protect the surface of the plate 21.

Figure 6E:
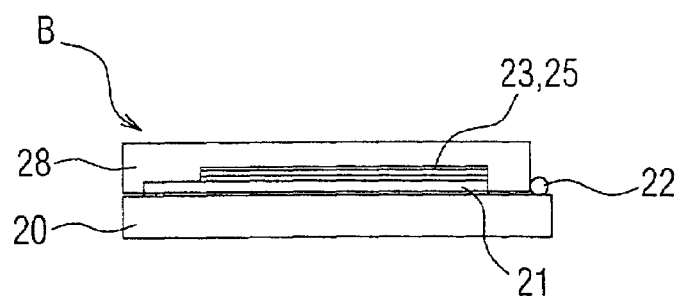
FIGS. 6E to 6G are diagrams showing structure of the reflective liquid-crystal display in the configuration of the first embodiment applied to a notebook-sized personal computer (PC)

The notebook-sized personal computer shown in FIG. 6E includes a lid 28. The reflective liquid-crystal display B is housed in the lid 28. When the lid 28 is closed, the light guiding plate 21, the polarizer 23, and liquid-crystal panel 25 are closely fixed to each other. The angle between the absorption axis of the polarizer 23 and the projection onto the polarizer 23 of light incident to the polarizer 23 is set, for example, to 80° as in the case above.

Figure 6F:
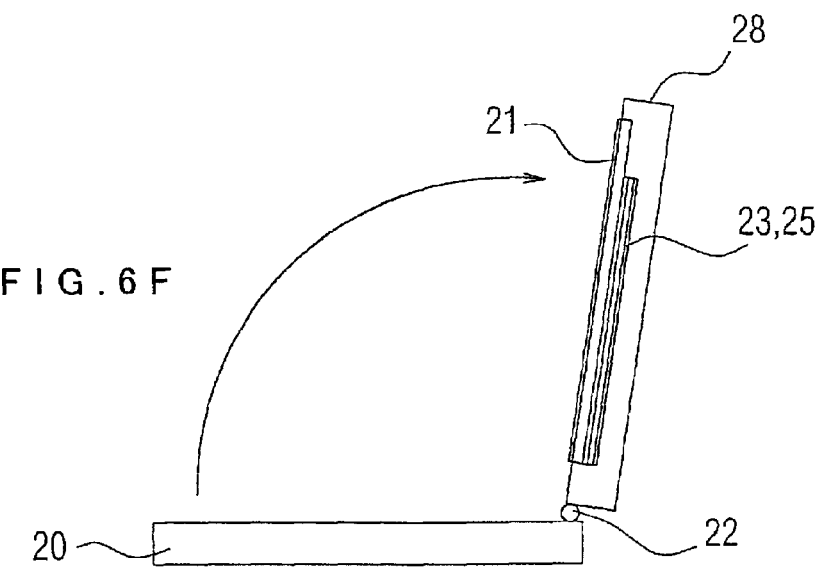
Figure 6G:
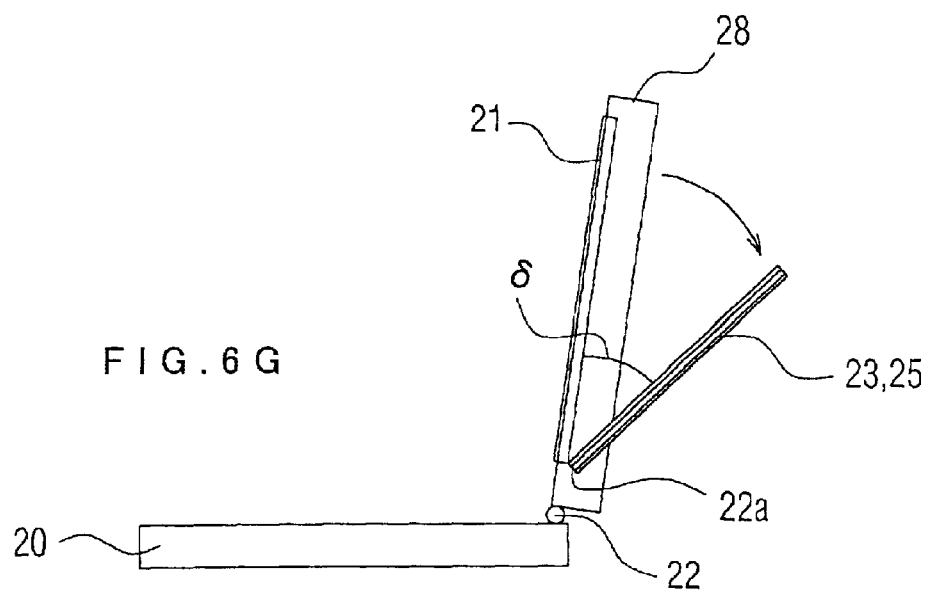

As shown in FIG. 6F, when the lid 28 is rotated, clockwise in the drawing, about the rotary shaft 22 relative to the body 20, the light guiding plate 21, the polarizer 23, and liquid-crystal panel 25 also are similarly rotated. As can be seen from FIG. 6G, the polarizer 23 and liquid-crystal panel 25 closely fixed to the polarizer 23 are rotated about the rotary shaft 22a relative to lid 28 and the light guiding plate 21. The angle between the light guiding plate 21 and the polarizer 23 and liquid-crystal panel 25 is adjusted substantially to δ. The reflective liquid-crystal display is similar in constitution to that of the first variation described above. Consequently, without increasing the power consumption, luminance of the liquid-crystal display can be increased without lowering contrast thereof.

By rotating the polarizer 23 and the liquid-crystal panel 25 about the rotary shaft 22a toward the light guiding plate 21, it is possible to house the polarizer 23 and the liquid-crystal panel 25 in the lid 28. Therefore, the notebook-sized personal computer can be easily housed and hence the user can easily carry about the personal computer.

As above, by applying the reflective liquid-crystal display implemented, for example, in the first variation of the first embodiment to an electronic apparatus including a liquid-crystal display such as a notebook-sized personal computer, it is possible to increase luminance and contrast of the display of the personal computer.

The inventor has further discussed and examined the technique to improve contrast of the display.

As shown in FIGS. 1A and 1B, the following fact has been detected. When light is emitted from a polarizer and when light enters the polarizer, light which passes the plane of incidence or emission as s-polarized light includes a smaller component of light which is emitted in a direction similar to a direction parallel to a surface of the light guiding plate (which has a larger angle θ between the direction of emission of the component of light and a normal of the surface of the light guiding plate) as compared with light which passes the plane of incidence or emission as p-polarized light. Moreover, the former includes a larger component of light which is emitted in a direction similar to a direction vertical to the surface of the light guiding plate (which has a smaller angle θ) as compared with the latter.

As the angle of light incident to the reflective liquid-crystal panel increase (as the angle θ increases, namely, the direction of light becomes similar to the direction parallel to the surface of the light guiding plate), contrast abruptly decreases. The light primarily including p-polarized light has a large value of θ relative to the normal and hence becomes stray light and contrast lowers depending on cases. To overcome the difficult, when the component of p-polarized light is removed and s-polarized light is selectively emitted from the polarized, there is obtained light having a small value of θ relative to the normal of the surface of the polarizer (the light is emitted in a direction similar to the direction vertical to the surface of the polarizer). By matching a projection of the main light propagation direction with the absorption axis of the polarizer on the liquid-crystal panel, that is, by matching the direction of vibration of s-polarized light with the absorption axis of the polarizer, the s-polarized light can be selectively emitted.

Transmission light which primarily includes s-polarized light and which is emitted from the polarizer includes a larger component of emission in a zone of angle near the direction vertical to the surface of the light guiding plate (with a small value of θ) and hence it is possible to display high-contrast images. Also in this case, it is not necessarily required to match the direction of s-polarized light completely with that of the absorption axis of the polarizer.

Figure 7A:
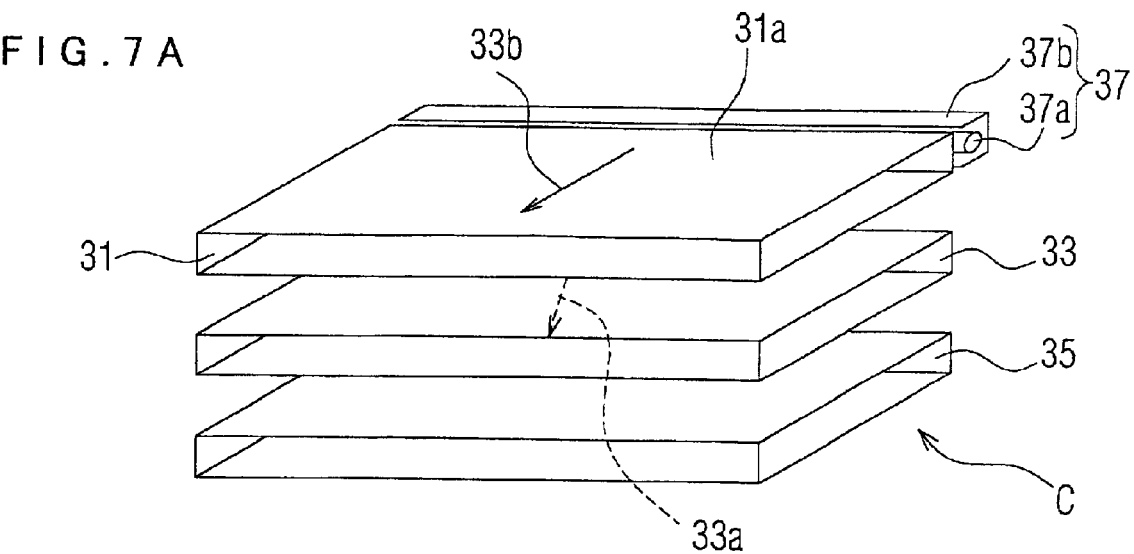
FIG. 7A is a perspective view, corresponding to FIG. 2, showing a reflective liquid-crystal display in a second variation of the first embodiment of the present invention.
Figure 7B:
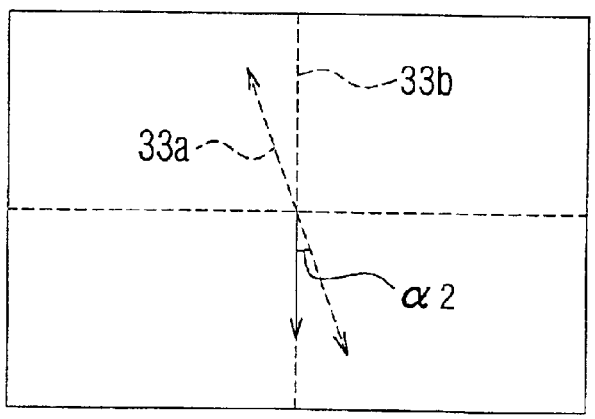
FIGS. 7B and 7C respectively correspond to FIGS. 2B and 2C.
Figure 7C:
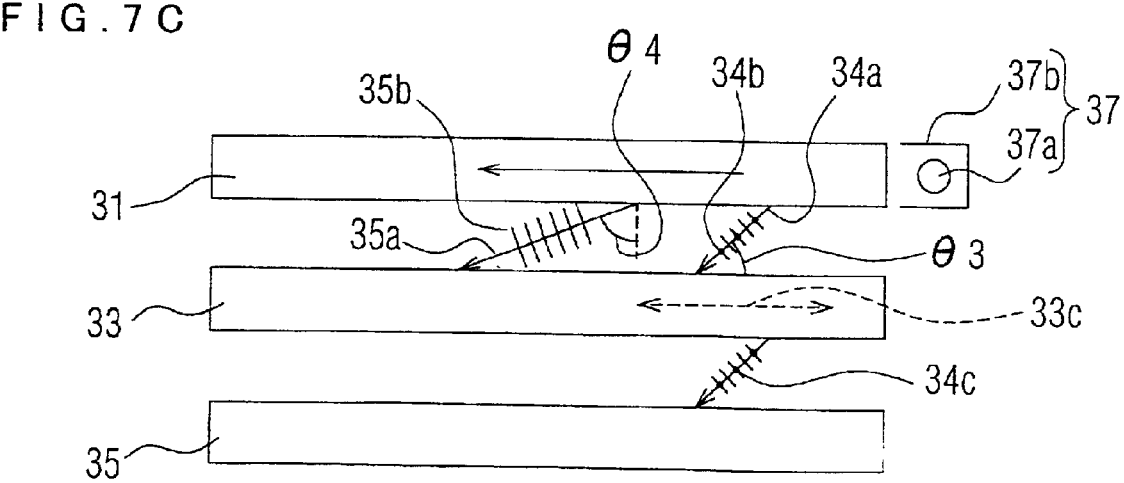

According to the discussion and the examination of the technique to improve contrast of the display, description will be given of a reflective liquid-crystal display in a second variation of the first embodiment by referring to FIGS. 7A to 7C. In FIGS. 7A to 7C, the same constituent components as those of FIGS. 1A and 1B are assigned with reference numerals of which each obtained by adding 30 to the associated reference numeral of FIGS. 1A and 1B. Detailed description of each component of FIGS. 7A to 7C will be avoided.

As shown in FIGS. 7A to 7C, in the reflective liquid-crystal display C in the second variation of the first embodiment, an absorption axis 33a of a polarizer 33 is substantially parallel to a primary propagation direction of light 33b. That is, the axis 33a is shifted 80° relative to a longitudinal direction of a cold-cathode tube 37a. For example, an angle α2 between the absorption axis 33a and a projection of light onto the polarizer 33 is 10°. It is favorable that the angle α2 ranges from 0° to 40°.

In this connection, the projection of polarized light is substantially vertical to the absorption axis of the polarizer 33.

As shown in FIG. 7C, when the polarizer 33 is arranged as described above, light 35a primarily includes p-polarized light 35b is almost completely absorbed by the polarizer 33. Therefore, light 34a primarily includes s-polarized light 34b is selectively emitted from the polarizer 33.

In the reflective liquid-crystal display, contrast is increased by about 11% when compared with a general reflective liquid-crystal display in which the polarizer is arranged so that the absorption axis of the polarizer is inclined 45° relative to the light propagation direction.

The angle to view the liquid-crystal panel 35 is not limited to the direction normal to the panel surface, but is changed according to purposes of utilization thereof. In such cases, it is only necessary to appropriately adjust the angle α2. Also in the reflective liquid-crystal display in the embodiment, contrast can be further increased by inclining the light guiding plate relative to the polarizer as shown in FIGS. 4A to 4C.

Figure 8A:
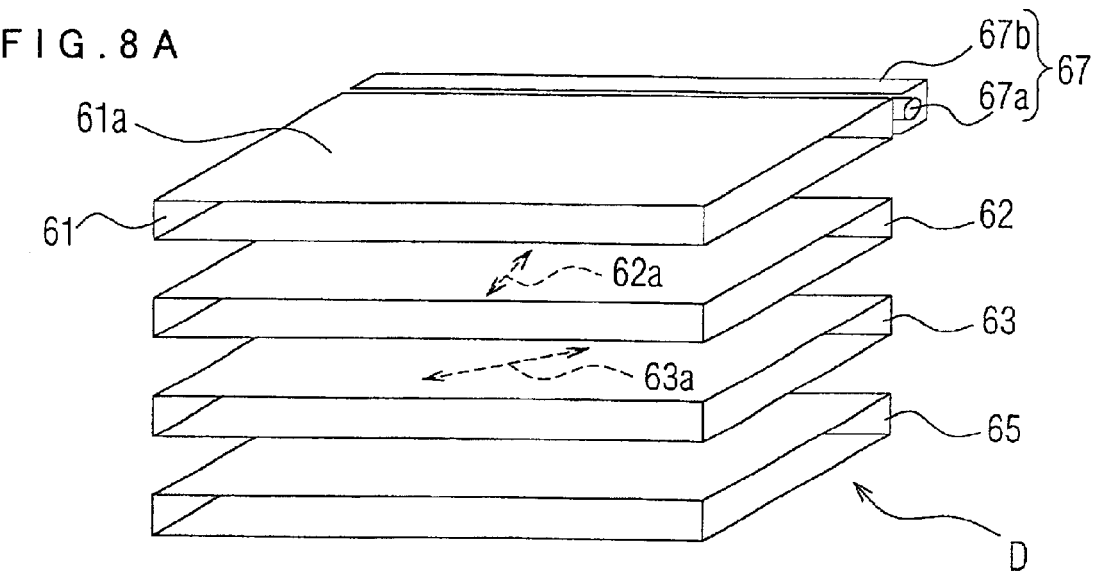
FIG. 8A is a perspective view, corresponding to FIG. 2, showing a reflective liquid-crystal display in a third variation of the first embodiment of the present invention.
Figure 8B:
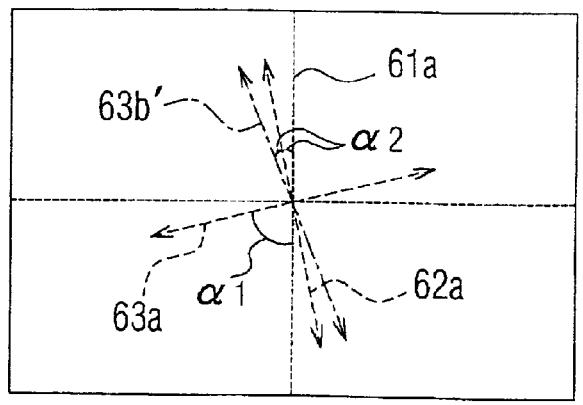
FIGS. 8B and 8C respectively correspond to FIGS. 2B and 2C.
Figure 8C:
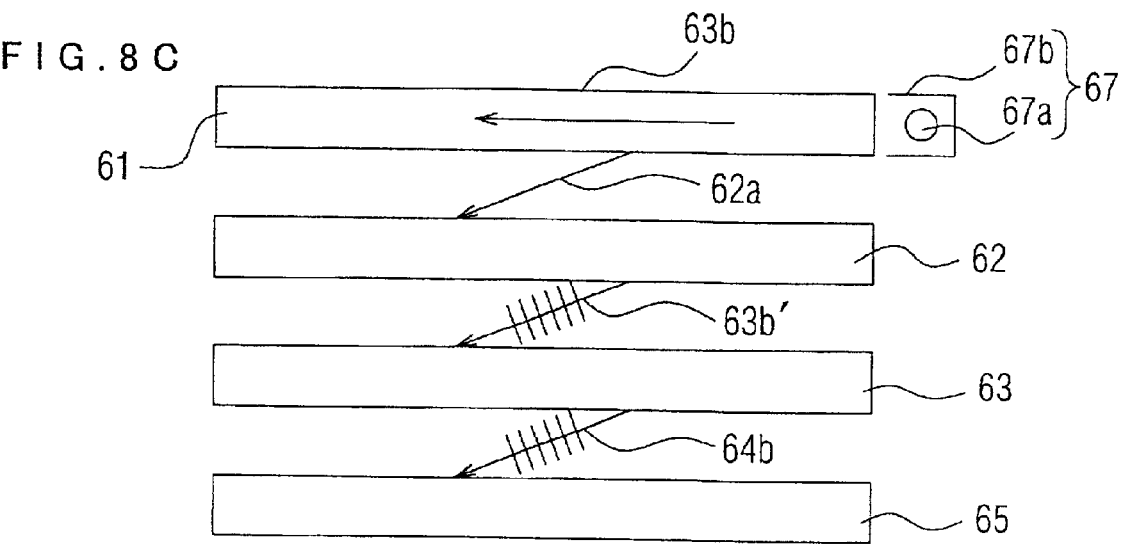

Referring next to FIGS. 8A to 8C, description will be given of a reflective liquid-crystal display in a third variation of the first embodiment. FIG. 8A shows an overall configuration of the display in a perspective view. FIG. 8B is a graph showing a relationship between an absorption axis of a polarizer of the display viewed from above and a direction of polarized light which is incident to the polarizer and which has a large amount of light. FIG. 8C shows a side view of the configuration of the display. In FIGS. 8A to 8C, the same constituent components as those of FIGS. 2A to 2C are assigned with reference numerals of which each is obtain by adding 60 to the associated reference numeral used in FIGS. 2A to 2C, and detailed description thereof will be avoided.

The reflective liquid-crystal display D shown in FIG. 8A includes, in addition to the components of the display shown in FIG. 2A, a retardation layer between the light guiding plate and the polarizer.

More specifically, the display D includes a light guiding plate 61, a retardation layer 62 disposed below the light guiding plate 61, a polarizer 63 disposed below the retardation layer 62, and a liquid crystal panel 65 disposed below the polarizer 63.

To obtain a better combination with the liquid-crystal panel 65 and to minimize defects thereof, an angle α1 is set to a value different from 90°. As shown in FIGS. 8B and 8C, an absorption axis 63a of the polarizer 63 is not completely vertical to a projection 63b of a direction of polarized light (p-polarized light in this case) as a primary component of light emitted from the light guiding plate 61. That is, a smaller one α1 of the angles therebetween is about 80°. In this situation, when the light emitted from the light guiding plate 61 directly enters the polarizer 63, selectivity of transmission light including p-polarized light as its primary component is deteriorated.

To overcome this difficulty, the retardation layer 62 is arranged between the light guiding plate 61 and the polarizer 63. By the retardation layer 62, the direction of polarization of light from the light guiding plate 61 to the polarizer 63 is adjusted such that a direction 61a of p-polarized light incident to the light guiding plate 61 matches that of the transmission axis of the polarizer 63 (that is, the direction 61a is almost vertical to the direction of the absorption axis 63a of the polarizer 63).

A smaller angle α2 between a direction vertical to the longitudinal direction (in which the light source extends) of the light guiding plate 61 and an optical axis 62a of the retardation layer 62 is, for example, about 10°. For example, when a halfwave plate is used as the retardation layer 62, light incident to the plate 62 differs in phase by 180° from a component vertical to the optical axis of light emitted from the plate 62. In this case, a direction 63b' of polarization of light which is transmitted through the plate 62 and which is incident to the polarizer 63 can be shifted by 2×α2 (i.e., about 20°).

Therefore, the polarization direction 63b' of light incident to the polarizer 63 can be substantially vertical to the absorption axis 63a of the polarizer 63. Light including p-polarized light as its primary component is selectively transmitted through the polarizer 63 and is then incident to the liquid crystal panel 65.

Also in a case of the reflective liquid-crystal display D in which the absorption axis of the polarizer is not vertical to the projection of the primary propagation direction of light emitted from the light guiding plate, for example, to minimize defects thereof, the polarization direction of light incident to the light guiding plate can be adjusted using the retardation layer.

Consequently, as in the reflective liquid-crystal display in the first embodiment, the amount of light is increased in the display above when compared with a general reflective liquid-crystal display.

Description will now be given of a reflective liquid-crystal display using a front-light light guiding plate in which a fine prism is arranged on a surface of the light guiding plate such that the alignment angle of light emitted to the liquid-crystal panel is almost vertical.

Figure 9:
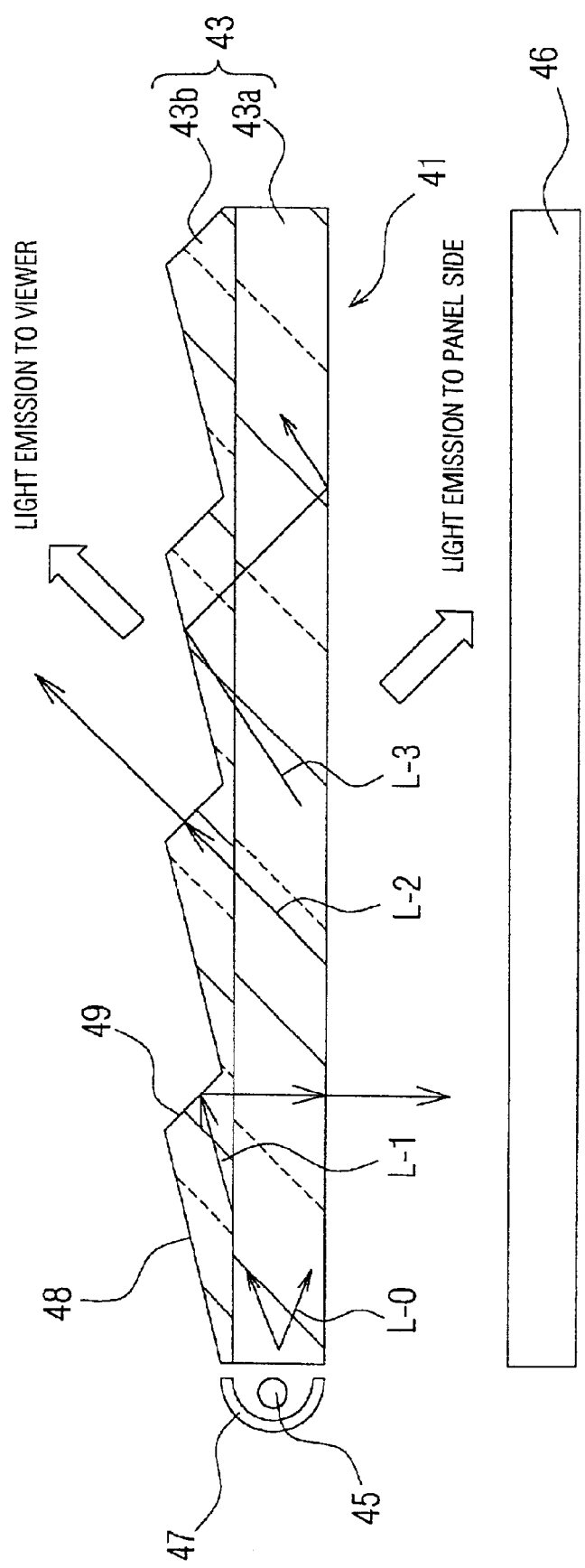
FIG. 9 is a diagram showing structure of a general light guiding plate of prism type.

FIG. 9 shows structure of a general light guiding plate of prism type.

As shown in FIG. 9, a prism-type light guiding plate 41 includes a planar plate body 43a and a large number of fine prisms 43b arranged on a surface of the plate body 43a, the surface opposing a light emission surface on a liquid-crystal panel side. Disposed on a side surface of the plate body 43a are a light source 45 and a reflector 47. A liquid-crystal panel 46 is arranged beneath the light guiding plate 43.

The prisms 43b are repeatedly formed on the surface of the plate body 43a. Each prism 43b has first plane 48 and a second plane 49. The first and second planes 48 and 49 respectively have, in a cross-sectional view, different angles with respect to the surface. The first plane 48 has a smaller angle than the second plane 49.

The light source 45 on the side surface of the plate body 43a emits light L-0. The light L-0 includes light L-1 to reflect on the second plane 49 and light L-3 to reflect on the first plane 48. The light beams L-0 and L-3 are emitted toward the lower side in the drawing.

However, light which propagates in a direction slightly different from that of the light L-1 and which has a larger angle with respect to the surface of the plate body 43a, for example, light L-2 propagating toward the second plane 49 possibly passes through the second plane 49 toward the opposite side. Presence of such a light component is not desirable in consideration of effective utilization of light. It has been actually known that many components of light such as the light L-2 pass through the second plane 49. When a large amount of such light is emitted to the viewer, quality of displayed images is lowered.

To decrease the amount of light to the viewer and to increase the amount of light to the liquid-crystal panel at the same time, it is only necessary to lower the amount of light indicted by L-2 while keeping the amount of light indicated by L-1 in FIG. 9 unchanged.

The inventor has considered that when a layer having a low refractive index, a reflection layer, and an absorption layer are disposed on an inner surface of the first plane 49 in this order, components of light emitted to the viewer can be reduced without degrading characteristics of light emitted to the liquid-crystal panel 46. Alternatively, either one of the layers above may be disposed on an inner surface of the first plane 49.

According to the consideration, description will be given of a reflective liquid-crystal display in a second embodiment of the present invention by referring to FIG. 10.

Figure 10:
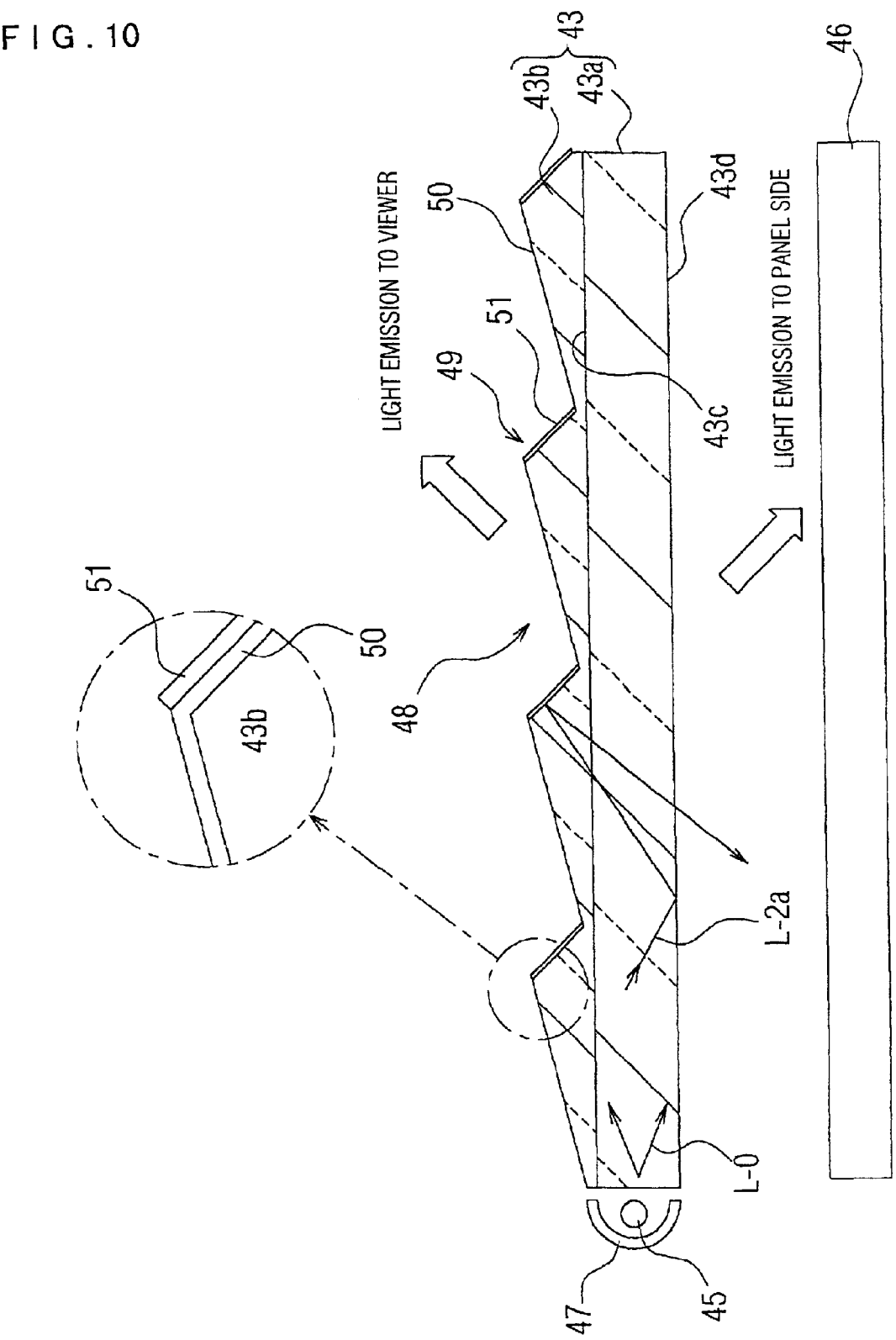
FIG. 10 is a diagram showing structure of a reflective liquid-crystal display in a second embodiment of the present invention.

As shown in FIG. 10, the reflective liquid-crystal display includes a light guiding plate 43a using polycarbonate having a refractive index n=1.59. On an upper surface of the prism 43b (including the first and second planes 48 and 49), a layer 50 is formed using a resin having a low refractive index. Specifically, a layer of fluorine resin having a refractive index n=1.34, namely, Cytop of Asahi Glass Co., Ltd. is formed in dip coating. The layer 50 serves as a reflection preventive film.

Thereafter, an overall surface of the layer 50 is coated with paint. The paint includes ultraviolet-ray setting resin in which fine powder of titanium oxide is dispersed. The painted surface is then exposed to ultraviolet (UV) rays. In this process, when light is introduced to the light guiding plate 43, the UV exposure can be conducted only on the second plane 49. The overall surface of the light guiding plate 43 is then rinsed to remove a white resin layer 51 from the first plane 48. Resultantly formed on the second plane 49 is a two-layer film including the layer 50 of resin with a low refractive index and the layer 51 of white resin.

The angle between a surface 43c of the light guiding plate 43 and the first plane 48 is, for example, 2°. The angle between a surface 43c of the light guiding plate 43 and the second plane 49 is, for example, 45°. The prisms 43b each of which includes the first plane 48 and the second plane 49 are repeatedly arranged with a pitch of about 0.2 millimeter (mm).

In the light guiding plate of prism type configured as above, light L-2a propagating to the second plane 49 reflects in the lamination including the layers 50 and 51. Most components of light incident to the second plane 49 reflect on a boundary between the second plane 49 and the layer 51 and on a boundary between the layer 51 and the layer 50. The light thus reflected is emitted from another surface (rear surface) 43d of the light guiding plate 43a in a direction (with an angle of emission) near a direction of a normal of the surface 43d. This consequently increases the amount of light radiated to the liquid-crystal panel 46. That is, of the light introduced from the light source 45 to the light guiding plate 43a, light propagating to the second plane 49 is reflected, and hence propagates toward the viewer with only a low probability. Most light propagates to the liquid-crystal panel 46.

Since the component of light emitted to the viewer side is lowered by the structure, quality of displayed images can be improved. In addition, since the component of light propagating to the liquid-crystal panel 46 arranged beneath the light guiding plate 43 is increased, the light emitted from the light guiding plate 43 can be efficiently used. This increases luminance of the reflective liquid-crystal display.

Figure 11:
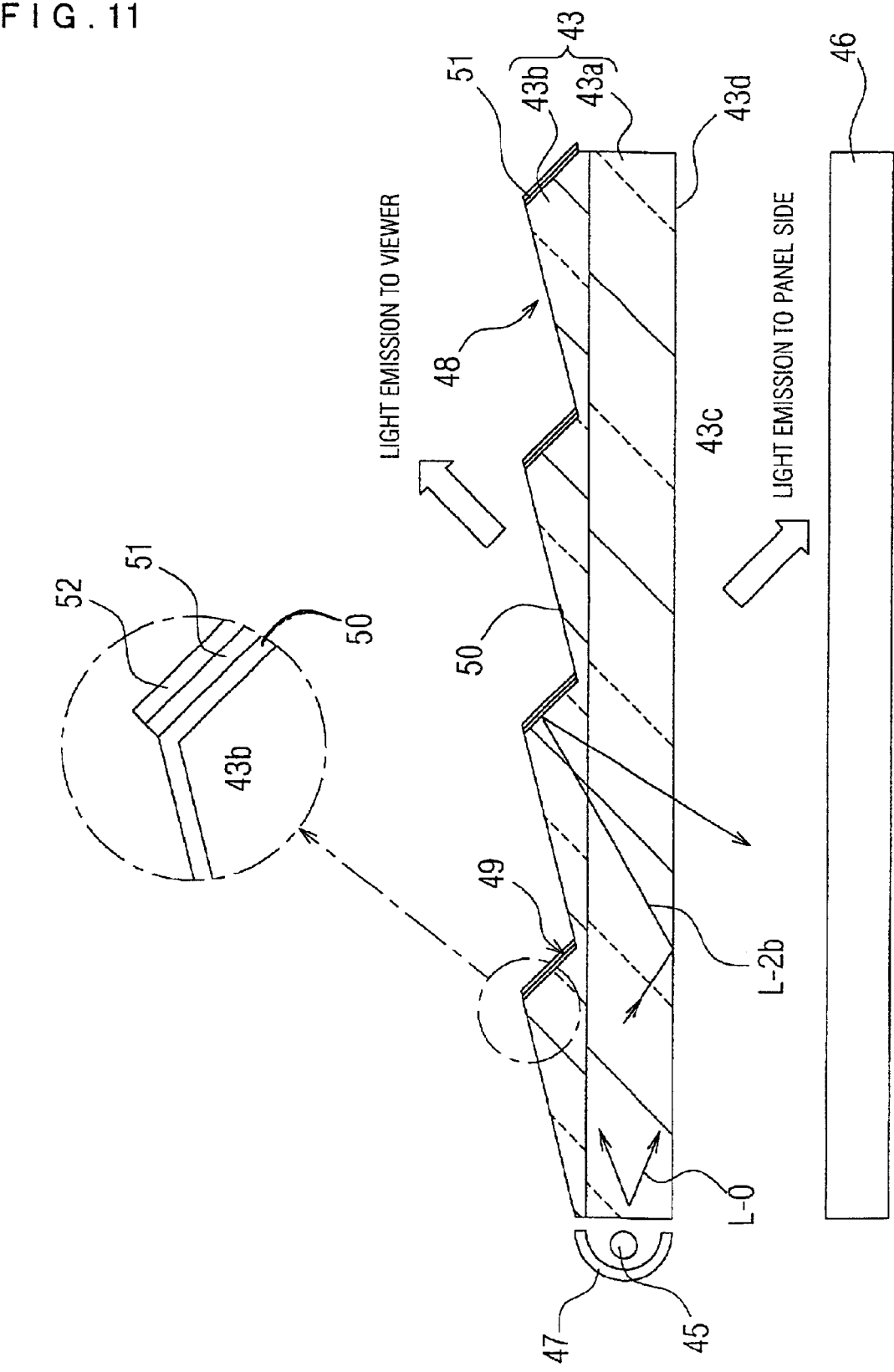
FIG. 11 is a cross-sectional view showing structure of a reflective liquid-crystal display in a variation of the second embodiment.

Next, description will be given of a reflective liquid-crystal display in a variation of the second embodiment by referring to FIG. 11. In FIG. 11, the same constituent components as those of FIG. 9 are assigned with the same reference numerals and detailed description thereof will be avoided.

As shown in FIG. 11, in reflective liquid-crystal display in the variation of the second embodiment, the white-resin layer 51 is formed only on the second plane 49 and a black-resin layer 52 is additionally formed on the layer 51. The black-resin layer 51 is formed in almost the same way as for the white-resin layer 51. Light L-2b propagates in a direction as in the case of the light L-2a shown in FIG. 10.

By disposing the light guiding plate 43c shown in FIG. 11, when the viewer watches the prism surface from the viewer side, the white resin is substantially not observed since the white resin is covered with the black resin. Resultantly, this further increases contrast of images displayed by the reflective liquid-crystal display.

In the description of the variation, the black-resin or which-resin layer is formed on either one of the first and second planes of the prism in the light guiding plate suitable for the reflective liquid-crystal display in the embodiment. Specifically, description has been given of examples of procedure to form the black-resin and which-resin layers.

For example, an oblique exposure technique may be employed. In this technique, a layer of UV-setting resin is formed on the substrate. As above, the first plane 48 has a first angle of inclination and the second plane 49 has a second angle of inclination larger than the first angle of inclination. A ultraviolet-ray beam is radiated in a direction substantially parallel to the second plane 49. Resultantly, the UV beam is selective radiated onto the first plane 48, and the UV resin remains on the second plane 49. By conducting a process to remove the white-resin or black-resin layer using the UV resin as a mask, the desired resin layer above can be kept remained on the second plane 49.

Alternatively, for example, a layer of UV setting resin is formed on a surface of the light guiding plate 43a on a side on which the prisms are formed. The UV exposure is then conducted on the opposing side of the light guiding plate 43a. The angle of incidence of the UV ray is changed, that is, the UV radiating direction is changed from the direction vertical to the surface of the light guiding plate 43a to the direction parallel to the first or second plane 48 or 49. This remarkably reduces the amount of UV ray incident to the first or second plane 48 or 49. Therefore, the white-resin or black-resin layer can be kept remained on the first or second plane 48 or 49.

Additionally, there may be employed a method in which a mask is formed in the vicinity of the surface 43c of the plate body 43a to conduct the patterning process using the mask.

As above, the reflective liquid-crystal display of the embodiment can improve quality of displayed images.

Referring next to FIGS. 12 to 15, description will be given of a reflective liquid-crystal display in the third embodiment.

Figure 12:
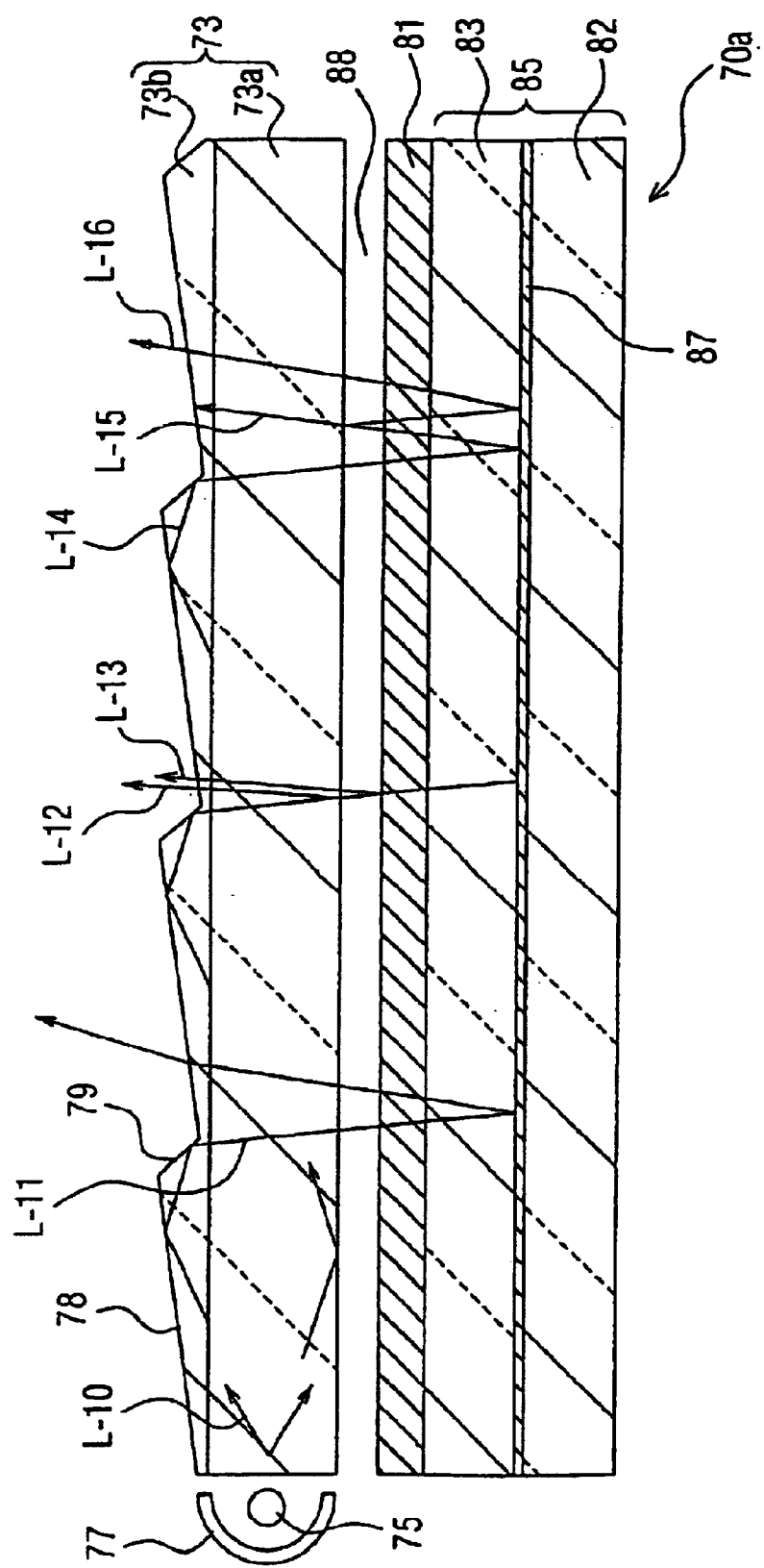
FIG. 12 is a cross-sectional view showing general structure of a reflective liquid-crystal display in a third embodiment of the present invention.

FIG. 12 shows an example of a general reflective liquid-crystal display. In FIG. 12, a section of a light guiding plate is almost the same in structure as that shown in FIG. 9. In FIG. 12, the same constituent components as those of FIG. 9 are assigned with reference numerals obtain by adding 30 to those used in FIG. 9, and detailed description thereof will be avoided.

The reflective liquid-crystal display 70a shown in FIG. 12 includes a polarizer 81 below the light guiding plate 73 of fine prism type and a liquid crystal panel 85 below the polarizer 81. The liquid-crystal panel 85 includes a liquid crystal layer, substrates (namely, a first substrate 82 and a second substrate 83) sandwiching the liquid-crystal layer, and a pixel electrode (reflective electrode) 87. The other components are almost the same as those shown in FIG. 3 and hence description thereof will be avoided. The light guiding plate 73 and the liquid-crystal panel are arranged according to a front-light optical system. In this configuration, a layer of air 88 is intercalated between the light guiding plate 73 and the polarizer 81.

Light L-10 emitted from an optical source 75 into the light guiding plate 73a repeatedly conducts total reflection on a surface of the light guiding plate 73 to be away from the optical source 75. Light L-11 reflects on the first or second plane 78 or 79 to propagate to the liquid-crystal panel 85. Light having reflected on the reflective electrode (pixel electrode) 87 in the panel 85 propagates again to the light guiding plate 73. The light then passes through the first or second plane 78 or 79 to propagate to the viewer. This resultantly displays a normal image.

However, in the reflective liquid-crystal display, a large number of optical boundaries exit in addition to the optical boundary between the reflective electrode 87 and the liquid-crystal layer. For example, light L-12 reflects on an optical boundary between a rear surface (on the side of the liquid-crystal panel 85) of the light guiding plate 73 (with a refractive index of 1.5) and the layer of air 88 (with a reflective index of 1.0) and light L-13 reflects on an optical boundary between the layer of air 88 and the polarizer 81 (with a refractive index of 1.5). The light L-12 and the light L-13 are reflected before they reach the liquid-crystal panel 85 and hence do not contribute to the display operation. Since light reflected on the overall surface is added to the light used for the display operation, an image displayed by the light becomes obscure because luminance of black increases.

Furthermore, reflection light reflected on the reflective electrode 87 also reflects on a boundary plane between the polarizer 81 and the air layer 88 and then reflects on another place of the reflective electrode 87. The light is indicated as L-16. When there exist the normally reflected light L-15 and the again reflected light L-16, a phenomenon of "ghost" takes place, that is, duplicated images are displayed. Although abnormal light like the light above is about 4% of the overall light, this light lowers the display contrast.

TABLE 1

Contrast

| 1. Without light guiding plate | 2. With light guiding plate |
|---|---|
| 500 | 23.8 |
| 100 | 20.0 |
| 50 | 16.7 |
| 10 | 7.1 |

Table 1 comparatively shows display contrast when only the liquid-crystal panel is present and display contrast when a light guiding plate is also present. According to Table 1, in a configuration using a light guiding plate, when the contrast of the liquid-crystal panel becomes greater, the influence of the problem on the contrast increases. In other words, Table 1 indicates that the contrast in the state using the light guiding panel cannot be remarkably increased only by improving the contrast of the liquid crystal panel.

The phenomenon in which the luminance of black increases and the phenomenon of "ghost" can be suppressed by a multi-layer anti-reflection (AR) process in which a multi-layer anti-reflection layer is formed on the light guiding plate and the polarizer. However, actually, the multi-layer AR process is a high-cost process. Therefore, when a wide are is required as in the liquid-crystal display for a personal computer, the AR process cannot be readily adopted due to the high cost.

The inventor devised an arrangement in which a low-refractive-index layer having a refractive index higher than that of the air layer (a low-refractive-index layer with a refractive index of 1.0) and lower than that of the lightguide plate (with a refractive index of 1.5) was sandwiched between the light guiding plate and the polarizer. The low-refractive-index layer is tightly fixed onto a rear surface of the light guiding plate and on a surface of the polarizer.

Figure 13:
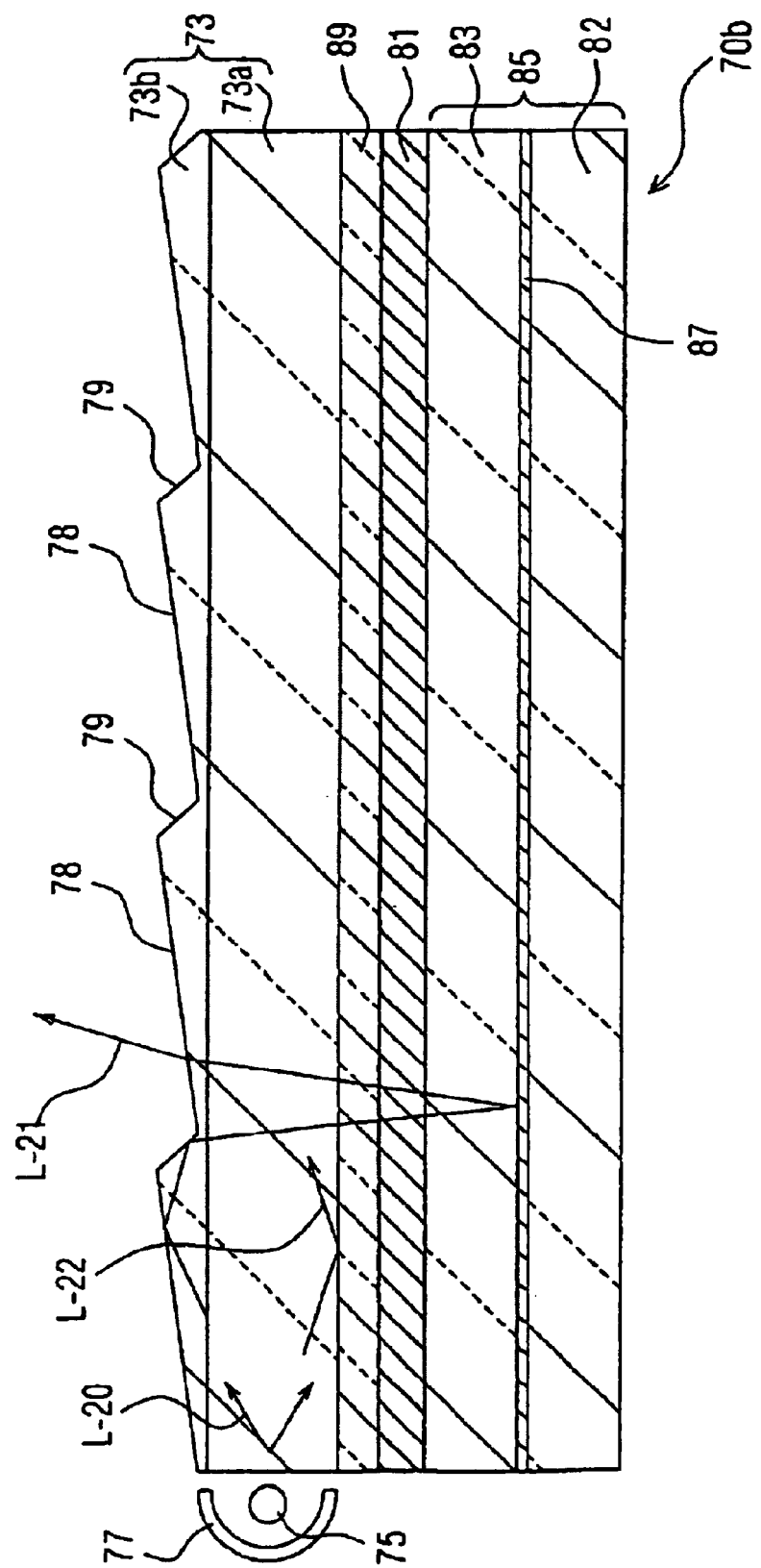
FIG. 13 is diagram showing a principle of the reflective liquid-crystal display.

FIG. 13 is a cross-sectional view showing the principle of a reflective liquid-crystal display 70*b* devised by the inventor.

As shown in FIG. 13, the display 70*b* includes a low-refractive-index layer 89 between a light guiding plate 73 and a polarizer 81, the low-refractive-index layer 89 being tightly fixed onto a rear surface of the light guiding plate 73 and on a surface of the polarizer 81.

Light L-20 emitted from a light source 75 into a light guiding plate 73*a* repeatedly conducts total reflection (L-22) on a surface of the light guiding plate to be away from the light source. Normal light L-21 reflects on a first plane 78 or a second plane 79 and proceeds toward a liquid-crystal panel 85. Light reflected on a reflective electrode (pixel electrode) 87 in the liquid-crystal panel 85 again proceeds toward the light guiding plate 73 and passes through the first plane 78 or the second plane 79 to the observer or viewer side. A normal image is displayed as a result.

In the reflective liquid-crystal display 70*b*, between the rear surface (on the side of the liquid-crystal panel 85) of the light guiding plate 73 (made of acrylic material with a refractive index of 1.5) and a surface of the polarizer 81 (made of polymer with a refractive index of 1.5), a low-refractive-index layer (with refractive index ranging from about 1.2 to about 1.4) is arranged to be fixedly attached onto the surfaces. No air layer appears therebetween. Since the light L-21 reflects only on the reflective electrode 87, the influence of the phenomenon in which the luminance of black increases and the phenomenon of "ghost" described in conjunction with FIG. 12 can be minimized.

When the layer has a refractive index of 1.34, the contrast is lowered about 0.3%. The reduction of contrast can be quite efficiently minimized as compared with that (about 4%) of the reflective liquid-crystal display of FIG. 12.

TABLE 2

| Refractive index | Reflection factor |
|---|---|
| 1.45 | 0.03% |
| 1.40 | 0.12% |
| 1.35 | 0.28% |
| 1.30 | 0.51% |
| 1.25 | 0.83% |
| ... | ... |
| 1.00 | 4.00% |

Table 2 shows a relationship between the refractive index of the low-refractive-index layer (material) 89 and the reflection factor per boundary. As can be seen from Table 2, when a medium with a refractive index of 1.0, i.e., air exists between the light guiding plate and the polarizer, there exists a high reflection factor of 4% per boundary. When a medium with a refractive index of 1.45 is interposed therebetween, the reflection factor is reduced to 0.03% per boundary.

In this regard, on the boundary between the low-refractive-index layer (material) and the light guiding plate, it is required that the light totally reflects in the light guiding plate as indicated by L-22 (FIG. 13).

TABLE 3

| Refractive index | Total reflection angle (critical angle) |
|---|---|
| 1.45 | 75.2 |
| 1.40 | 69.0 |
| 1.35 | 64.2 |
| 1.30 | 60.1 |
| 1.25 | 56.4 |
| ... | ... |
| 1.00 | 41.8 |

Table 3 shows a relationship between the refractive index of the low-refractive-index material and the critical angle (relative to the normal of the surface) for the total reflection. As shown in Table 3, when the refractive index of the low-refractive-index material becomes smaller, the total reflection occurs more easily (the critical angle decreases).

Therefore, in consideration of Table 2 and Table 3, it is favorable to employ the low-refractive-index material with a refractive index n ranging from about 1.2 to 1.4.

Figure 14:
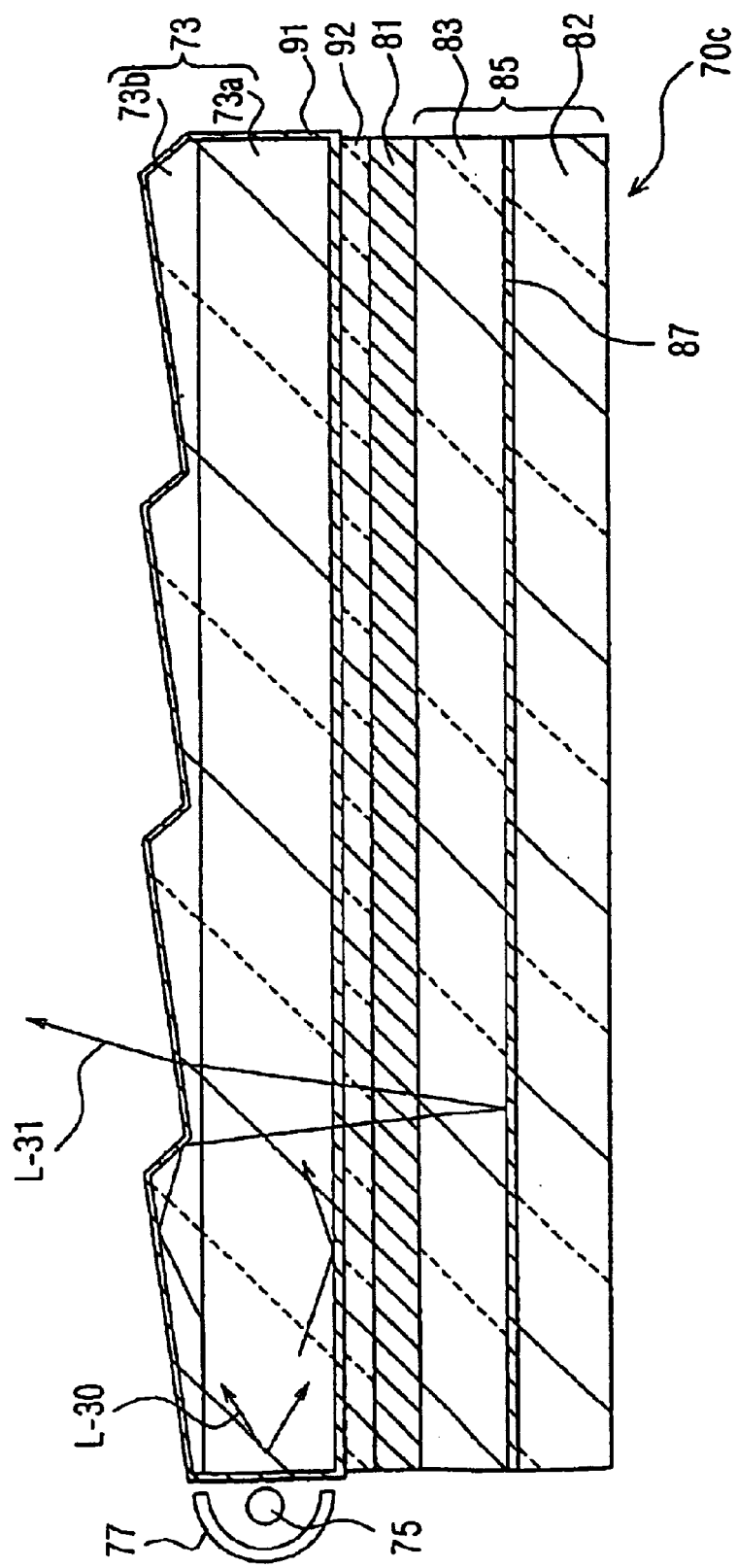
FIG. 14 is a cross-sectional view showing structure of a reflective liquid-crystal display in a third embodiment of the present invention.
Figure 15:
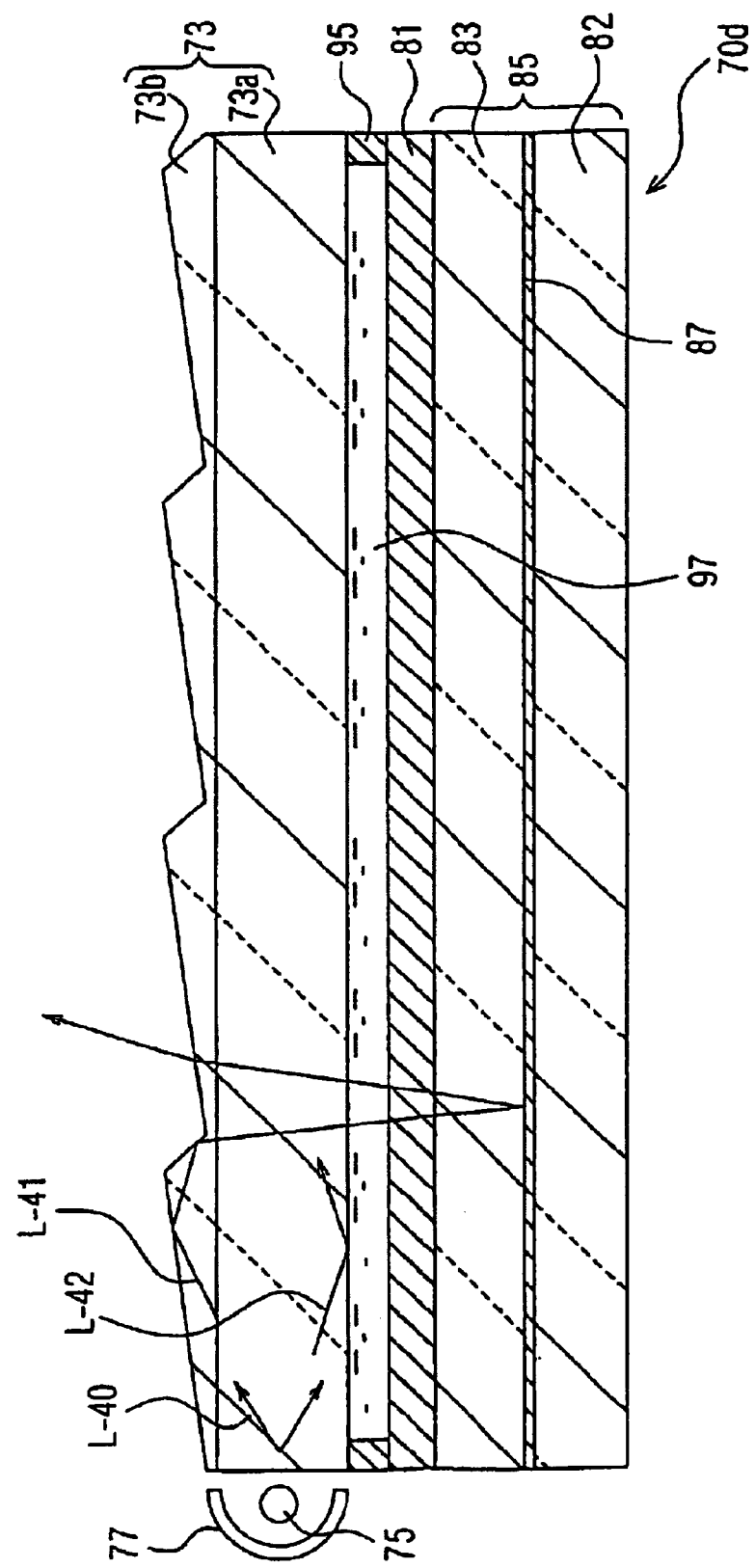
FIG. 15 is a cross-sectional view showing structure of a reflective liquid-crystal display in a variation of the third embodiment.

Referring now to FIGS. 14 and 15, description will be specifically given of structure of a reflective liquid-crystal display of the embodiment.

FIG. 14 is a cross-sectional view of a reflective liquid-crystal display of the embodiment.

As shown in FIG. 14, a single AR coat layer 91 is formed on a surface of the light guiding plate 73. Disposed between a rear surface of the light guiding plate 73 and a surface of the polarizer 81 is an optical adhesive agent 92, which tightly fixed the light guiding plate onto the polarizer 81.

For the AR coat layer 91, there is used, for example, Cytop of Asahi Glass Co., Ltd. Since the dip coating method can be used to form the AR coat layer 91, the layer 91 can be more easily formed when compared with the general film forming processes using evaporation and/or sputtering. In the configuration, the optical adhesive agent 92 generally employed is used, that is, the agent has a refractive index of 1.5.

The optical reflection plane of the reflective liquid-crystal display 70c is disposed between the light guiding plate 73 and the AR coat layer 91 and between the AR coat layer 91 and the optical adhesive agent 92. These optical boundaries have reflective indices of 1.5 and 1.34, respectively. As shown in Table 2, the boundary reflection occurs only one tenth or less on the boundaries when compared with the reflection on the boundary formed by air. Additionally, according to Table 3, the total reflection angle (critical angle) for the refractive index of 1.34 takes a large value of about 60°, and the condition to totally reflect light in the light guiding plate is not particularly severe.

In the light L-30 (L-32) emitted from the light source 75, the ratio of normal light L31 which reflects on the reflective electrode 87 is increased. Since an AR coat layer 91 is also disposed on an upper surface of the light guiding plate, the total amount of light is increased. A single AR coat does not particularly increase the manufacturing cost.

In a situation in which the contrast is about 20 with only a crystal-liquid panel, the contrast is about 5 when a front-light of general structure is used. On the other hand, when the front-light of the embodiment is used, a high contrast of 12 is obtained.

FIG. 15 is a cross-sectional view of a reflective liquid-crystal display in a variation of the embodiment.

As shown in FIG. 15, a seal member 95 is arranged between the light guiding plate 73 and the polarizer 81 along both edge or peripheral sections thereof, and a liquid low-refractive-index layer 97 is filled in a space resultantly prepared.

The liquid low-refractive-index layer 97 is made, for example, of fluoro silicone oil. It is only necessary to use, for example, FS1265-300cs of Toray-Dow-Coning Silicone. The substance has a refractive index of 1.381. Moreover, fluorine-based inert liquid "Fluorinert" of 3M (with a refractive index ranging from 1.24 to 1.30), pure water (with a refractive index of 1.38), and ethyl alcohol with a refractive index of 1.35) may be used.

Also in the reflective liquid-crystal display 70d, in light L-40 (L-42) emitted from the light source 75, the ratio of light L-41 which reflects on the reflective electrode 87 increases. By the reflective liquid-crystal display, the contrast can be increased.

Next, description will be given of a PDLC liquid-crystal display not using a polarizer. In the liquid-crystal display employing a PDLC liquid crystal, it is not necessary to use a polarizer, and hence the display has possibility to produce a brighter images. However, the display has a problem the scattering characteristic of the polymer layer is low and loss of light is considerably large. To enhance the light scattering characteristic, there has been known a technique to dispose shallow projections and depressions on a surface of the liquid-crystal surface. This however leads to a problem that the scattering increases in the direction of regular reflection, and the quantity of light emitted in the direction orthogonal to the surface of the liquid crystal is rarely increased.

In the lighting apparatus, by using the light preventive film, s-polarized light of the polarized light emitted from the light guiding plate to the polarizer can be selectively emitted from the polarizer. Since the light emission angle of the s-polarized light (an angle with respect to a normal of the surface of the polarizer) is large, it is possible to increase the emission angle of light emitted from the polarizer to the liquid-crystal panel.

In the reflective liquid-crystal display, of the light propagating through the light guiding plate, light traveling toward the second inclined plane totally reflects on a boundary plane between the light guiding plate and the low-refractive-index layer and a boundary plane between the low-refractive-index layer and the reflection layer. Therefore, the component of light passing through the second inclined plate can be reduced, and it is possible to increase the component of light emitted from the opposing surface of the first surface in a direction substantially parallel to the normal. In the reflective liquid-crystal display, it is possible to suppress the reflection of the light emitted from the lighting apparatus on the boundary plane formed by a layer of air, at incidence to the liquid-crystal panel. Consequently, a normal image can be displayed.

The inventor proposed a technique to increase the light focusing characteristic by increasing the degree (depth) of projections and depressions on the surface of the liquid crystal. By using the technique, it is possible regardless of the direction of incidence of the external light to focus the light of an image modified by the liquid crystal in the orthogonal direction. This will lead to production of a light-crystal display having high front luminance.

Figure 16:
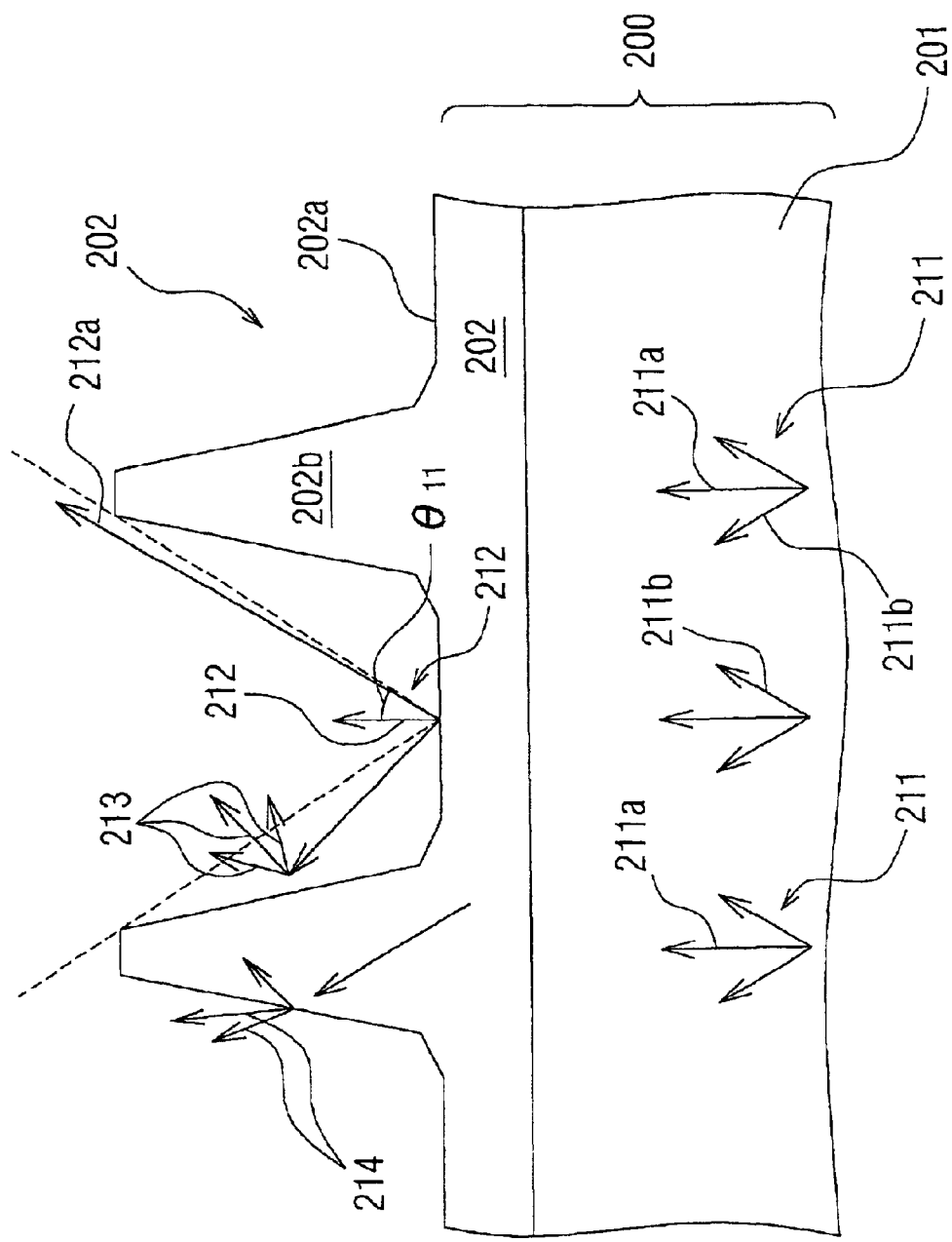
FIG. 16 is a diagram showing structure of an alignment sheet.
Figure 17:
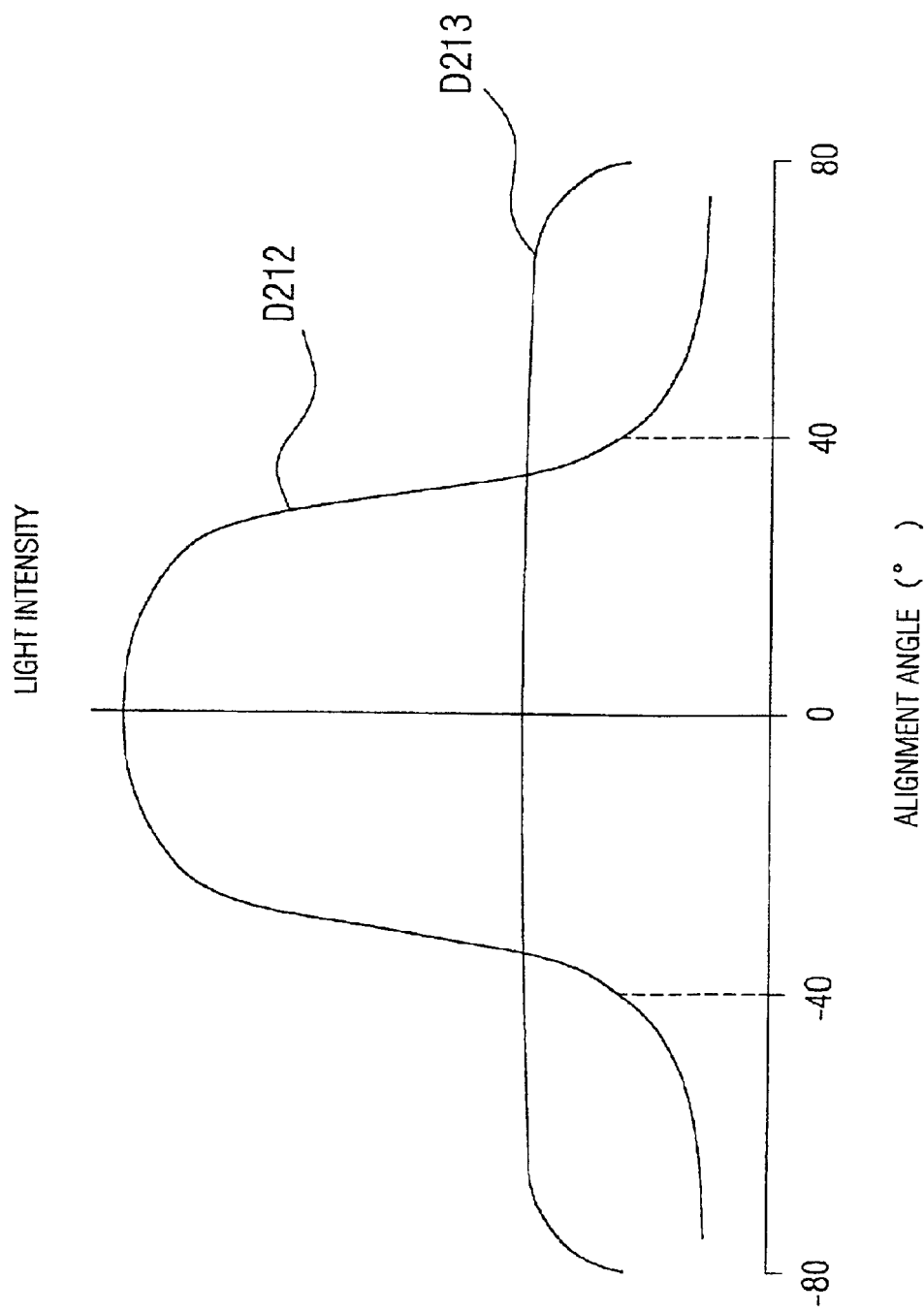
FIG. 17 is a graph showing a relationship between an alignment angle and light intensity when the alignment sheet shown in FIG. 16 is used.

Description will be given of the principle and operation of an alignment sheet proposed by the inventor by referring to FIGS. 16 and 17. FIG. 16 shows a general configuration of an alignment sheet. FIG. 17 is a graph showing a relationship between an alignment angle and intensity of light.

An alignment sheet 200 includes a base section 201 having generally a flat surface and an alignment control section 202 formed on one surface of the base section 201. The alignment control section 202 includes a flat section 202a having a flat surface and a large number of projections 202b projected in a direction from the flat section 202a, the projections 202b opposing the base section 201. The projections 202b are disposed, for example, in a regular fashion. Each projection 202b has width which becomes thinner toward its tip end. Incident light 211 entering the alignment sheet 200 has, as described above, a component 211a in a direction of a normal of the surface of the alignment sheet 200 and a component 211b diagonal to the surface of the alignment sheet 200.

Of light 212 emitted from the flat section 202a, only light 212a within a predetermined range of angles (0 to θ11 in this diagram) influenced by the projection 202b is emitted to a space beyond the projection 202b. Oblique light having an angle more than θ11 is scattered by or passes through the projection 202b. Or, the oblique light reflects thereon and light 213 having a wide angle range appears.

In the graph of FIG. 17, an angular distribution of intensity of light 212 of the light shown in FIG. 16 is indicated by D212 and an angular distribution of intensity of light 213 of the light shown in FIG. 16 is indicated by D213.

As shown in FIG. 17, the light 212 has an alignment angle ranging from −40° to 40°. The light 213 has an alignment angle ranging from −80° to 80°. An actual alignment angle of the emitted light is obtained as a total of D212 and D213. Therefore, the light 212 is dominant, and by disposing the projections 202b, it is possible to emit light including a primary component which is relatively orthogonal light and for which the alignment angle ranges from −40° to 40°.

Description will now be given of a scattering liquid-crystal display employing the alignment sheet according to the principle described above.

Figure 18:
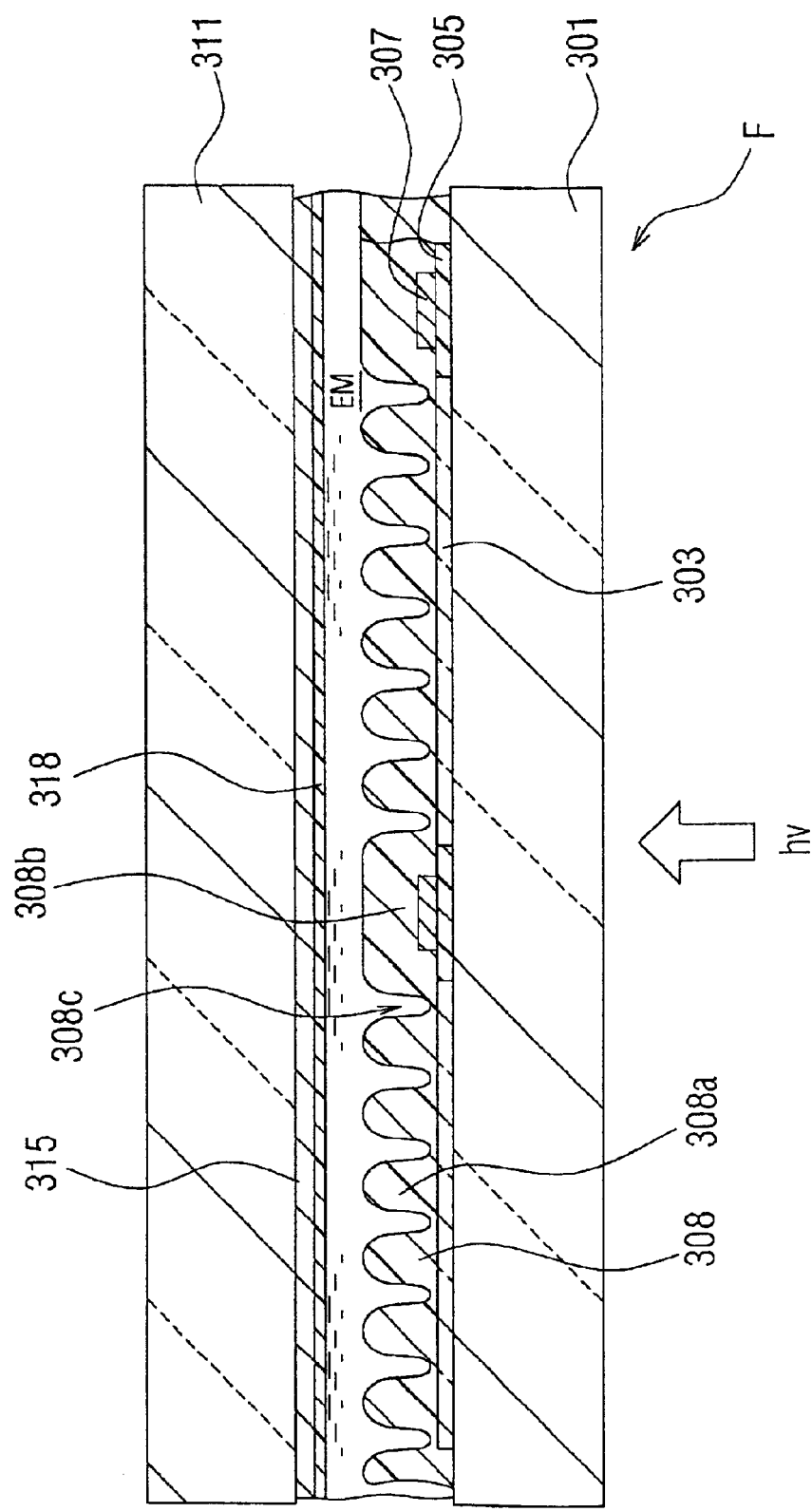
FIG. 18 is a cross-sectional view showing structure of a reflective liquid-crystal display in a fourth embodiment.
Figure 19:
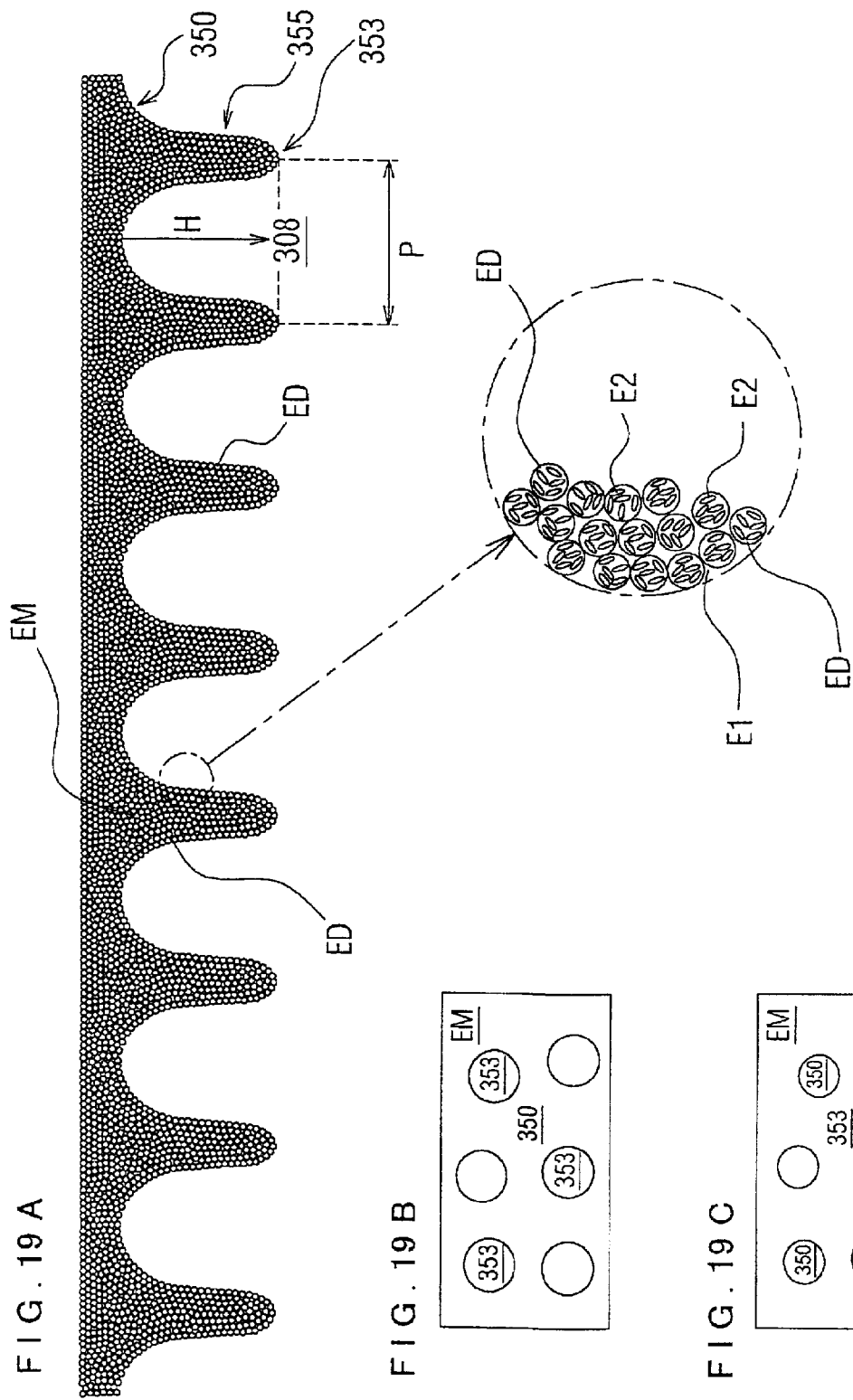
FIG. 19A is a side view schematically showing a liquid-crystal layer of scattering type.
FIG. 19B is a plan view schematically showing the liquid-crystal layer of scattering type.
FIG. 19C is a plan view schematically showing a variation of the liquid-crystal layer of FIG. 19B.
Figure 20:
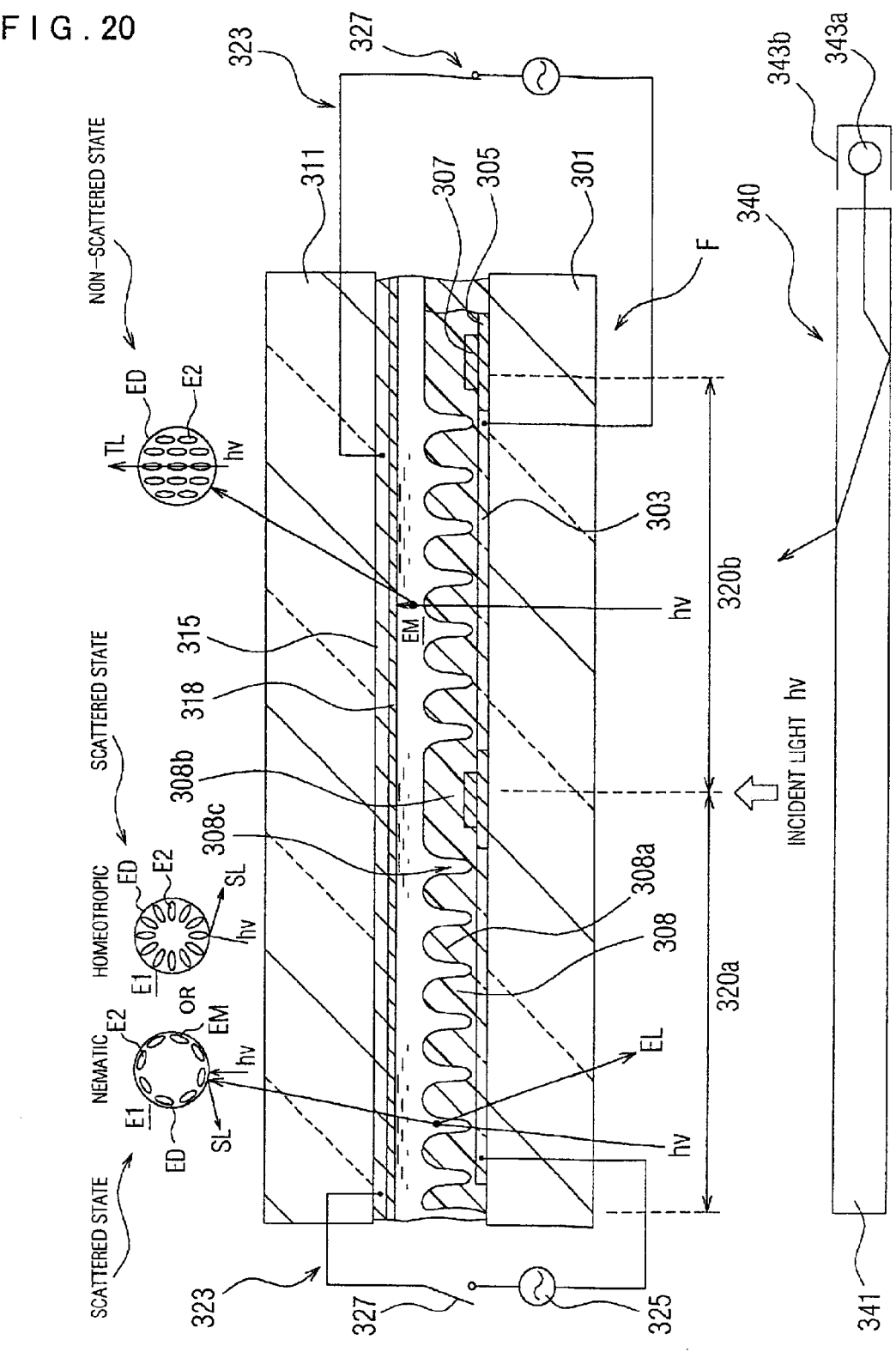
FIG. 20 is a diagram for explaining a principle of operation of the reflective liquid-crystal display shown in FIG. 18.

Referring now to FIGS. 18 to 20, description will be given of a scattering liquid-crystal display in a fourth embodiment.

Description will be given of a procedure to produce a scattering liquid-crystal display. As shown in FIG. 18, on a first transparent glass substrate 301, transparent pixel electrodes 303 of, for example, indium tin oxide (ITO) and black polyimide regions 305 are formed by photolithography. The black polyimide regions 305 are formed between the transparent pixel electrodes 303 of adjacent pixels, respectively. Formed on the black polyimide region 305 is a bus electrode 307. The bus electrode 307 is an electrode to sends signal charge to the pixel electrodes 303.

Next, formed on the first transparent glass substrate 301 is a transparent polyimide layer 308. The polyimide layer 308 includes a large number of projection forming sections 308a, with respective projections, formed respectively on the region of the transparent pixel electrode 303 and flat sections 308b, respectively with a relatively flat upper surface, respectively formed on the black polyimide regions 305.

The projection forming section 308a includes a large number of substantially conical regions each of which extends in a direction to apart from the first transparent glass substrate. The conical region is thinner toward its tip section. Therefore, disposed between the projections formed in the projection forming section 308a are depressions 308. Each depression 308 is thinner toward the first transparent glass substrate 301.

Many projections are formed in one pixel region.

The flat section 308b has a slightly wide, flat upper surface on the transparent polyimide layer 308 and the bus electrode 307. The flat section 308b is formed along the bus electrode 307 at a position to partition each pixel region. The black polyimide region 305 just below the bus electrode 307 is disposed to prevent incident light hv from the first transparent glass substrate 301 from being reflected on the bus electrode 307.

Formed on the overall surface of a second transparent glass substrate 311 is a common electrode 315 on which a black polyimide layer 318 is formed.

The first transparent glass substrate 301 and the second transparent glass substrate 311 are arranged such that the transparent pixel electrodes 303 oppose the common electrode 315. The first and second substrates 301 and 311 are fixed to each other using, for example, a seal member, not shown, arranged in a circumferential section of the grass substrates 301 and 311 to resultantly form an empty cell.

The empty cell is then filled with a polymer dispersion liquid crystal including a polymer matrix precursor and a substance having liquid-crystal composition. By polymerizing the polymer matrix, polymer dispersion liquid-crystal layer (to be referred to as a scattering liquid-crystal layer herebelow) EM.

It is favorable that the polymers of the PDLC have a refractive index substantially equal to that of liquid-crystal molecules in liquid-crystal droplets in an aligned state. As a result, light smoothly propagates without being refracted by the boundary. The transparent polyimide layer 308 favorably has a refractive index substantially equal to that of liquid-crystal molecules in the PDLC. This enables light to smoothly propagate also in the transparent polyimide layer 308.

To form a layer having the light scattering characteristic, there can be used, in addition to the PDLC in which liquid-crystal droplets are dispersed in a polymer, a material obtained by impregnating a substance of net structure with a liquid crystal. There may also be used a material which can switch the light scattering characteristic of the liquid crystal.

FIGS. 19A to 19C shows a general configuration of a scattering liquid-crystal layer. FIG. 19A is a side view of a scattering liquid-crystal EM viewed from a side of the scattering liquid-crystal display. FIG. 19B is a plan view of the scattering liquid-crystal EM viewed from a lower side of FIG. 19A. FIG. 19C is a plan view of a variation of FIG. 19B.

As shown in FIG. 19A, the scattering liquid-crystal EM includes a set of many liquid-crystal droplets ED. In this embodiment, the material having liquid-crystal composition is a material having nematic liquid-crystal composition. As the polymer matrix precursor, a mixture of an acrylate-based monomer and an oligomer is employed. The polymer matrix is produced by ultraviolet ray polymerization (the polymerization starting material is Darocure 1173 of Chiba-Gaigi).

In place of the material of nematic liquid-crystal composition, it is possible to use other materials of liquid-crystal composition such as a material of cholesteric liquid-crystal composition and a material of homeotropic liquid-crystal composition. In place of the mixture of an acrylate-based monomer and an oligomer, there may be used other polymer materials such as methacrylate-based materials and other materials of liquid-crystal polymers having an optical characteristic (particularly, index ellipsoid) similar to that of the material of liquid-crystal composition.

For the polymerization, thermal polymerization using a heating process may also employed. However, the thermal polymerization possibly delays polymerization, and there appears a tendency that the diameter of liquid-crystal droplets become greater. Therefore, to produce fine liquid-crystal droplets (with a diameter of about one micrometer ($\mu$m)), it is necessary to lower the polymerization temperature, to increase viscosity of the material, or to uniform the temperature distribution. In the production using the thermal polymerization, a sever polymerization condition must be used.

When a monomer or oligomer based on a liquid-crystal polymer having an optical characteristic (particularly, index ellipsoid) similar to that of the material of liquid-crystal composition is employed as the polymer matrix precursor, an electric filed is applied in a direction orthogonal to the substrate and light is radiated to the material to thereby conduct a reaction of optical polymerization.

As shown in FIG. 19A, by the technique of the embodiment, there can be produced with high precision a scattering liquid-crystal layer EM in which many liquid-crystal droplets ED are aggregated in the polymer matrix E1. In more detail, many liquid-crystal molecules E2 are included in the liquid-crystal droplet ED.

Referring now to FIGS. 18, 19A, and 19B, the scattering liquid-crystal layer EM is formed along each projection of the projection forming section 308a of the transparent polyimide layer 308. Specifically, a tip end section of each projection of the projection forming section 308 corresponds to a depression 350 of the scattering liquid-crystal layer EM, and a base end section of the projection of the projection forming section 308 corresponds to a projection 353 of the scattering liquid-crystal layer EM. Formed between the depression 350 and the projection 353 is an inclined section 355. The projections and the depressions, two methods are available as follows.

First, a uniform-refractive-index layer is formed on a substrate and is coated with photo resist. The photo resist is patterns in a desired contour and the uniform-refractive-index layer is etched to form projections and depression. Next, a paneling process is conducted to form an empty cell. The cell is then filled with, for example, a mixture of monomer liquid-crystal materials having a photopolimerization characteristic. By photopolimerization, there is constructed a liquid-crystal panel including a scattering liquid-crystal layer having projections and depressions.

Second, a material of granular liquid crystal is mixed with a volatile liquid to prepare a liquid substance. A substrate is the coated with the liquid substance. When the volatile material is evaporated from the liquid substance, projections and depressions are formed on a surface thereof. When a volatile liquid having lower viscosity is used and the volatile liquid is evaporated in an electric field, the projections and the depressions have a large amplitude H. Projections and depressions can be created on the liquid-crystal layer in this method.

It is favorable that the amplitude H between the projections and the depressions of the scattering liquid-crystal layer EM is about at least one half of the pitch P between the projections and the depressions.

The projections and the depressions of the scattering liquid-crystal layer EM may also have a contour in which the surface draws substantially a sign curve (FIG. 19A), a contour in which the projection has a cross section of a rectangular shape, a contour in which the projection has a cross section of a triangular shape, and the like. The cross-sectional contour is not limited only if projections and depressions are created.

It is also possible to form projections and depressions as follows. A substrate is coated with photo-setting material in which liquid crystal is dispersed. A mold including a surface having projections and depressions is pushed against an upper surface of the photo-setting material to thereby form projections and depressions. Photolithography and etching (over-etching) may also be employed to form projections and depressions.

As shown in 19C, the polymer liquid-crystal layer EM may be configured such that the depression 350 has a contour extending along a surface of the cone, and the projections 353 are formed around the depression 350.

In the liquid-crystal display F shown in FIG. 18, the distance between the common electrode 315 and the transparent pixel electrode 303 is about 20 $\mu$m (the scattering liquid-crystal region EM has a thickness ranging from 10 $\mu$m to 20 $\mu$m; the pitch between the projection and the depression is about 10 $\mu$m). It has been confirmed that the system normally operates when the voltage across the transparent pixel electrode 303 and the common electrode 315 is at most 20 volt (V).

The principle of operation of the reflective liquid-crystal display produced as above will be described by referring to FIG. 20.

FIG. 20 corresponds to FIG. 18.

In the reflective liquid-crystal display of FIG. 20, only two pixels including a first pixel 320a and a second pixel 320b are shown for simplicity. Disposed between the transparent pixel electrode 303 and the common electrode 315 is a voltage applying means 323 to apply voltage to the electrodes 303 and 315. The voltage applying means 323 includes an alternating-current (ac) power source 325 and a switch 327. There is also disposed a front-light system 340 to radiate light (hv) from a rear-surface side of the first transparent glass substrate 301. The front-light system 340 includes a light guiding plate 341 disposed in parallel with the first transparent glass substrate 301, a light source 343a disposed at an edge surface of the light guiding plate 341, and a reflective cover 343b.

Light (hv) is emitted from the front-light system 340 to enter the first transparent glass substrate 301 from the rear-surface side thereof. The incident light hv enters from the side of the first transparent glass substrate 301 into a scattering liquid-crystal region EM. As shown in the second pixel 320b, when the switch 327 is turned on, an electric field is applied to a space between the transparent pixel electrode 303 and the common electrode 315. Liquid-crystal molecules E2 in the liquid-crystal droplet are aligned to be substantially orthogonal to a surface of the substrate. The incident light hv is not scattered, but is absorbed by the black polyimide 318 on the common electrode 315. The second pixel 320b resultantly displays black.

As shown in the first pixel 320a, when the switch 327 is turned off, an electric field is not applied to a space between the transparent pixel electrode 303 and the common electrode 315. Liquid-crystal molecules E2 in the liquid-crystal droplet are aligned to be vertical or parallel to the boundary between the liquid-crystal droplet ED and the polymer matrix E2. For example, when the liquid-crystal molecules E2 are nematic liquid-crystal molecules, the molecules E2 align to be parallel to the boundary. When the liquid-crystal molecules E2 are homeotropic liquid-crystal molecules, the molecules E2 align to be vertical to the boundary. In either cases, the incident light hv is scattered in the proximity of the boundary. Most scattered light SL is reflected. Reflection light EL reflected and returned passes again through the first transparent glass substrate 301 and enters the eyes of the viewer. Therefore, the first pixel 320 displays white. The scattered light SL is converted into light primarily including light orthogonal to the substrate according to an influence or effect of the shape of the scattering liquid-crystal layer EM, that is, according to the principle described by referring to FIGS. 16 and 17. This consequently increases luminance in the vertical direction of the light thus emitted. That is, in the process of scattering and reflection above, the scattered and reflected light emits with a higher probability from the depression (valley) 350 of the scattering liquid-crystal layer EM having projections and depressions. Light from the inclined plane 355 between the projection (mountain) 353 and the depression 350 in the projected section 308 is directly emitted if the light proceeds in a direction not apart from the vertical direction relative to the substrate 301. Light proceeding in a direction apart from the vertical direction with respect to the surface of the substrate (the direction is not apart from the horizontal direction) enters again in a region of liquid-crystal droplets ED in the next projection 308 and is scattered therein. These steps successively take place. Consequently, in the emission light EL from the first transparent glass substrate 301, luminance of the light vertical to the substrate surface becomes stronger.

As described above, in the scattering liquid-crystal display of the embodiment, even if external light enters from any direction, the light is in principle focused in the vertical direction.

It is desirable to minimize the difference in the refractive index between the polymer matrix as the binder of the scattering liquid-crystal layer EM and the transparent polyimide layer 308 to flatten the contour of projections and depressions. With a large difference in the refractive index, when a voltage is developed across the transparent pixel electrode and the common electrode, light is scattered on the projections and the depressions in the boundary between the polymer matrix and the transparent polyimide layer 308. This increases the probability that the light does not reach the black polyimide layer (absorption) 318 and is scattered and reflected toward the side of the viewer (the display light emission side), and hence contrast lowers.

By adjusting the density of liquid-crystal droplets, an effective refractive index thereof, and size thereof, it is possible to regulate the light scattering function. Particularly, when the liquid-crystal drops have a diameter of at most 5 μm, the scattering characteristic of the droplets becomes remarkable as described above, which increases the amount of light emitted from the reflective liquid-crystal display.

When the diameter of the liquid-crystal drops is at most 1 μm, the wavelength of visible light is almost equal to the diameter. Therefore, the light scattering phenomenon considerably depends on the wavelength. By forming the liquid-crystal layer with a mixture of liquid-crystal drops having different diameters, it is possible to suppress non-uniformity in color display.

As above, in the scattering liquid-crystal display of the embodiment, the emission light is focused in the direction vertical to the substrate surface. Generally, the viewer of the liquid-crystal panel intends substantially vertically to view or to watch the scattering liquid-crystal display, and hence displayed image become brighter.

Therefore, in the scattering liquid-crystal display of the embodiment, by modifying the incident light into light substantially vertical to the substrate surface, images can be displayed with brightness which is several times to several tens of times the brightness of the scattering liquid-crystal display of the prior art.

As liquid crystal having the light scattering characteristic to focus light described above, there may be used PDLC in which liquid-crystal droplets are dispersed in a polymer, a material in which gaps in a network structure are impregnated with liquid crystal, and the like. There may be used a substance in which the scattering characteristic of the liquid crystal can be switched.

Next, referring to FIG. 21, description will be given of a scattering liquid-crystal display in a first variation of the fourth embodiment.

The scattering liquid-crystal display is configured in almost the same way as for that shown in FIG. 18. However, the display of FIG. 21 differs from that of FIG. 18 in that the incident light enters from the substrate side on which the common electrode is formed.

Figure 21:
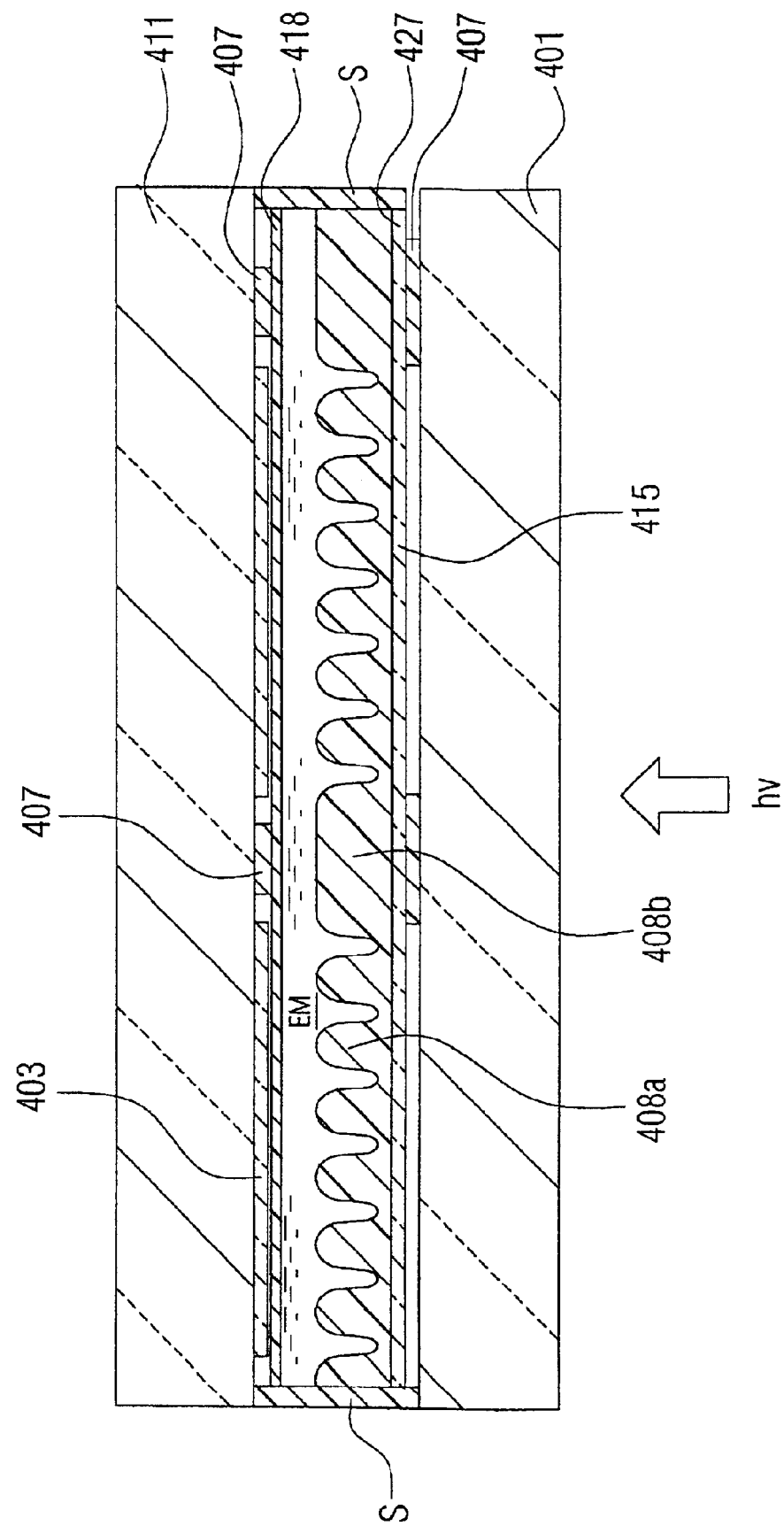
FIG. 21 is a cross-sectional view showing structure of a reflective liquid-crystal display in a variation of the fourth embodiment.

As shown in FIG. 21, formed on a first transparent glass substrate 401 is a black polyimide layer 407 to define pixel areas or regions. The black polyimide region 407 is formed between adjacent pixel areas. Formed thereon is a transparent common electrode using, for example, ITO. Next, a transparent polyimide layer 408 is formed on the first transparent glass substrate 401. The transparent polyimide layer 408 includes a flat section 408b formed on the black polyimide layer 407 and a projection forming section 408a formed on other than the black polyimide layer 407, the section 408a having many projections. Each projection formed in the projection forming region 408 is thinner as the projection extends in an opposing direction from the first transparent glass substrate 401 to the tip end.

Formed on a second glass substrate 411 (formed below the substrate 411 in FIG. 21) is a bus electrode 407 between the pixel regions. A large number of pixel electrodes 403 are formed by disposing a gap between the bus electrodes 407. On the overall surface thereof, a black polyimide layer 418 is formed.

The first and second transparent glass substrate 401 and 411 are arranged such that the transparent pixel electrodes 403 oppose the common electrode 415. The first and second substrates 401 and 411 are fixed to each other using, for example, a seal S arranged in a circumferential section of the grass substrates 301 and 311 to resultantly form an empty cell. Next, the empty cell is then filled with a polymer dispersion liquid-crystal layer in which many liquid-crystal droplets are dispersed using a polymer matrix.

In the reflective liquid-crystal display shown in FIG. 21, light enter from a rear surface (opposing the second glass substrate 411) of the first glass substrate 401 on which the common electrode 427 is formed. The reflective liquid-crystal display operates basically in the same way as that shown in FIG. 21.

FIG. 22 is a diagram generally showing an overall configuration of a display using a reflective liquid-crystal display of the fourth embodiment or a reflective liquid-crystal display of a variation of the fourth embodiment.

As shown in FIG. 22, a display H includes a liquid-crystal panel F and a front-light apparatus 340.

The liquid-crystal panel F shows only a primary section of the liquid-crystal panel shown in FIG. 18 or 21. The other configurations are almost the same as those shown in FIG. 18 or 21.

As can be seen from FIG. 22, the liquid-crystal panel F includes a light absorbing layer 318, a scattering liquid-crystal layer EM formed on the layer 318, the layer EM including an upper surface having projections and depressions; and a transparent resin layer 308a formed thereon to flatten the projections and depressions. The liquid-crystal panel F of FIG. 22 is drawn upside down when compared with the liquid-crystal panel of FIG. 18 or 21. Disposed on the liquid-crystal panel F is a front-light apparatus 340 with a gap section G therebetween. The front-light apparatus 340 includes a light guiding plate 341 made of, for example, acrylate resin and a light source 343 disposed on an edge surface thereof. The light source 343 includes a cold-cathode tube (a light emitting element) 343a and a reflector 343b.

Light hv emitted from the light guiding plate 341 enters the liquid-crystal panel F. Light entered from an upper surface of the liquid-crystal panel F passes through the transparent resin film 308a and enters the scattering liquid-crystal layer EM. Of light emitted from the front-light apparatus 340 and incident to the scattering liquid-crystal layer EM and external light, light having an angle of at most 42° relative to the normal of the surface of the liquid-crystal panel F enters the liquid-crystal layer. When the light hv is scattered in the scattering liquid-crystal layer EM, there appears reflection light primarily including light substantially parallel to the normal of the surface of the liquid-crystal panel F. Therefore, in this scattering liquid-crystal display when viewed from the vertical direction, images can be displayed with brightness which is several times to several tens of times the brightness of the scattering liquid-crystal display including the general scattering liquid-crystal layer.

In the scattering liquid-crystal display of the embodiment, the emission light is focused in the direction vertical to the substrate surface. The viewer of the liquid-crystal panel substantially vertically views the scattering liquid-crystal display, and hence displayed image become brighter.

Next, description will be given of an example in which the scattering liquid-crystal layer of the embodiment is applied to a scanning backlight.

An apparatus used as a backlight of a liquid-crystal display or the like in the prior art must be kept on during the frame period. Consequently, when a mobile picture is displayed on the liquid-crystal display, the contour of images is blurred depending on cases. To prevent the disadvantageous phenomenon, there have been already devised (1) a method in which the liquid-crystal display displays black only for a predetermined period during the frame period, namely, a method using a so-called "optical shutter", (2) a method in which a side-light backlight is turned off for a predetermined period during the frame period, and (3) a method in which using a backlight (a backlight of just below type) in which many cold cathode tubes are arranged in parallel with a predetermined interval therebetween just below liquid crystal, a process in which the cold cathode tubes are sequentially turned on and off beginning at an edge side is repeatedly conducted.

However, in the method of (1), since the liquid crystal has a low response speed, there cannot be obtained a sufficiently effective advantage. In the method of (2), the write operation is sequentially conducted in the pixels of the liquid-crystal display beginning at the upper-most side. Since the overall screen is turned off and on at a time, there exists a pixel area which cannot be effectively operated with a profit of the back light, and there also arises a problem of non-uniform luminance. In the method of (3), when many cold cathode tubes are used, the production cost soars, and the power consumption also increases; moreover, the size of the display becomes great.

To cope with the problems above, the inventor devised a method in which the scattering liquid-crystal layer having projections and depressions applied to the reflective liquid-crystal display of the six embodiment is applied to the scanning backlight.

Figure 23A:
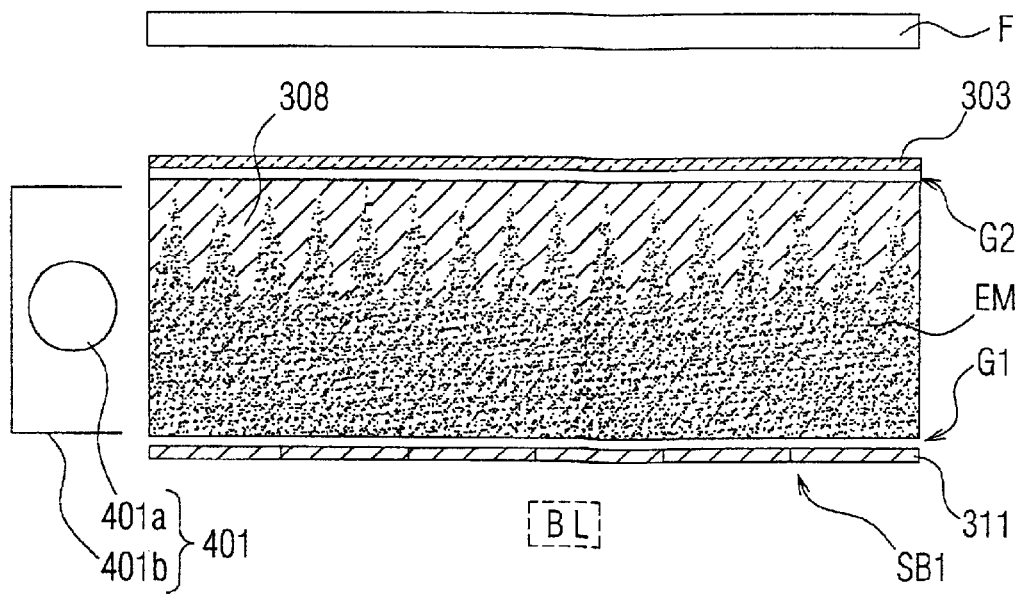
FIGS. 23A and 23B are diagrams showing a principle of a backlight of scan type.
Figure 23B:
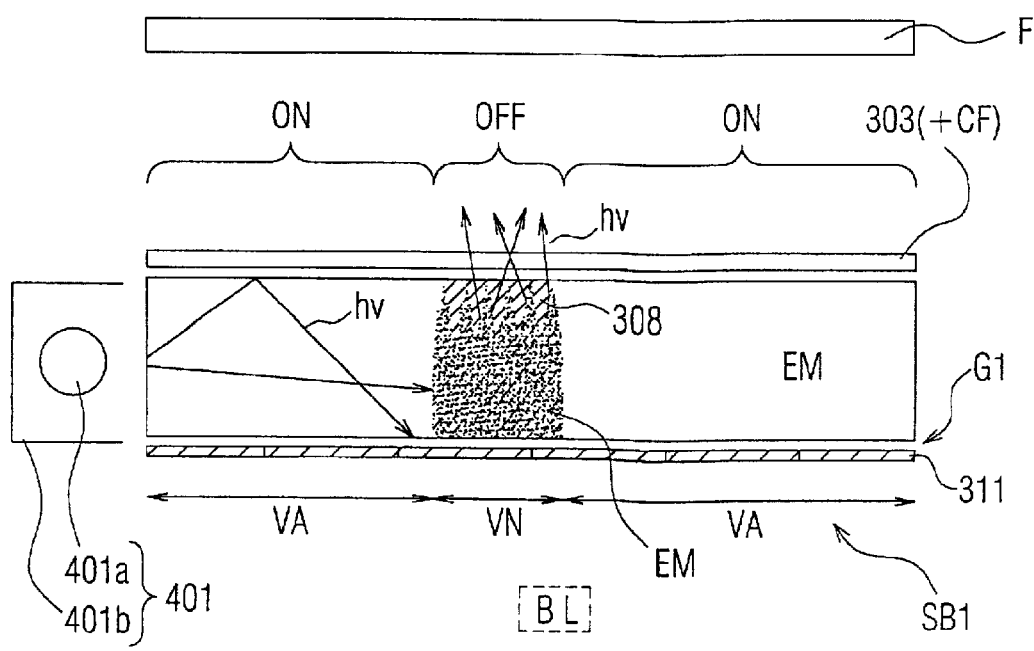

Referring now to FIGS. 23A and 23B, description will be given of the principle of the scanning backlight to which the scattering liquid-crystal layer is applied.

FIGS. 23A shows a general configuration of the scanning backlight. FIG. 23B shows the principle of operation of the scanning backlight.

As shown in FIG. 23A, a scanning backlight SB1 is formed in a planar contour and includes an electrode 311, a scattering liquid-crystal layer EM formed on the electrode 311, the layer EM including a surface having projections and depressions; a flattening transparent resin layer 308 formed on the layer EM, and a transparent electrode 303 formed on the resin layer 308. Formed between the electrode 311 and the scattering liquid-crystal layer EM is an layer of air or a reflective layer G1. Formed between the transparent resin layer 308 and the transparent electrode 303 is an layer of air or a reflective layer G2. On an edge surface of the planar body, there are arranged a side light system 401 including a light source (light emitting element) 401a and a reflective plate 401b. Over the transparent electrode 303, there may be disposed a body as a target of light, for example, a liquid-crystal panel F. The electrode 311 includes a set of band-shaped electrodes (five electrodes in FIG. 23A) extending from a front side of the sheet of FIG. 23A to a rear side thereof, and a voltage free area to which no voltage applied is formed only in a partial area. The flattening transparent resin layer 308 favorably has a refractive index substantially equal to that of the scattering liquid-crystal layer EM.

As shown in FIG. 23B, in a voltage applied area VA, liquid-crystal molecules in the scattering liquid-crystal layer EM align, for example, such that a longitudinal axis of the liquid-crystal is parallel to the normal of the substrate. Light hv from the side light 401 is not scattered in the scattering liquid-crystal layer EM. Therefore, no light is emitted to the side of the viewer (the upper side in FIG. 23B) and hence the liquid-crystal panel F displays black in the area VA. When a backlight BL is disposed in place of the side light, the voltage applied area VA becomes an illumination area.

On the other hand, in the voltage free area VN, the light hv is scattered in the scattering liquid-crystal layer EM. Consequently, the light hv is emitted to the side of the viewer and hence the liquid-crystal panel F displays white in the area VN. When a backlight BL is disposed in place of the side light, the voltage free area VN becomes a non-illumination area.

When a liquid-crystal display including the scanning backlight SB1 as the backlight, the liquid-crystal panel F can be configured in various structure.

Description will now be specifically given of the scanning backlight and a display using the scanning backlight.

Figure 24:
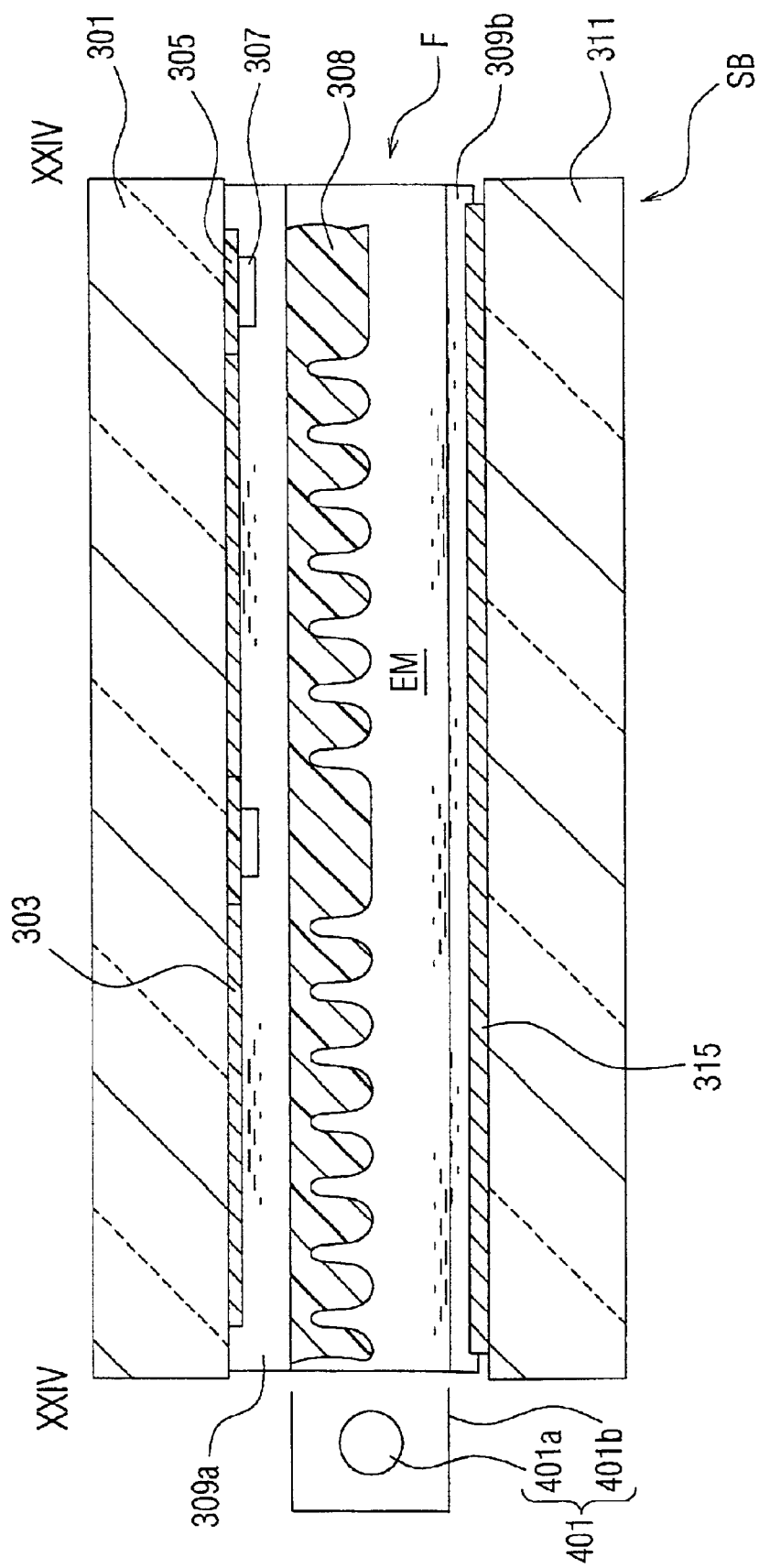
FIG. 24 is a cross-sectional view showing structure of a scan-type backlight in a fifth embodiment of the present invention.
Figure 25:
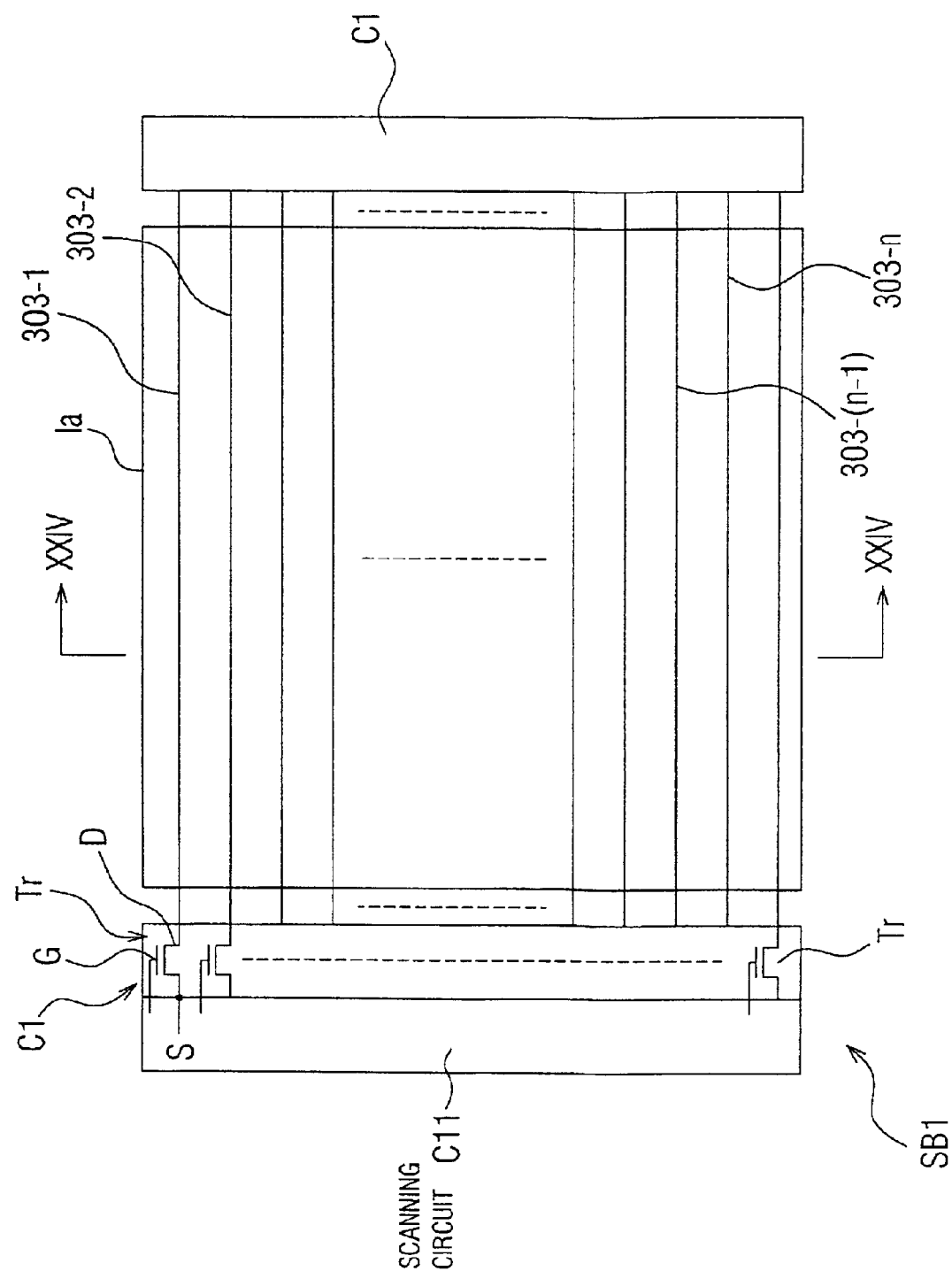
FIG. 25 is a plan view showing structure of a scan-type backlight in the fifth embodiment.

Referring now to FIGS. 24 and 25, description will be given of the scanning backlight in the fifth embodiment.

FIG. 24 shows structure of the scanning backlight in a cross-sectional view. FIG. 25 shows in a plan view a general configuration of a scanning backlight including a scanning line driving circuit for the scanning of the scanning backlight.

As shown in FIG. 24, a scanning backlight SB1 includes a substrate 311, a common electrode 315 formed on the substrate 311, a fluorine-based liquid-crystal layer 309a formed on the electrode 315, a scanning liquid-crystal layer EM formed on the layer 309a, the layer EM including a surface having projections and depressions; and a transparent polyimide layer 308 formed on the layer EM. A transparent substrate 301 is arranged to oppose the substrate 311, and many transparent electrodes 303 are formed on a lower surface of the transparent substrate 301. The transparent electrode 303 is a band-shaped electrode extending, for example, from the upper-surface side of the sheet of FIG. 24 to the rear-surface side thereof. Formed between the transparent electrodes is a black polyimide layer 305 to define pixel regions or areas. Bus electrodes 307 are formed on the black polyimide layer 305. Formed thereon is a fluorine-based liquid-crystal layer 309a.

In the fluorine-based liquid layer 309a, pillar members and beads are arranged. Using these members, a predetermined space can be held between the scanning liquid-crystal layer EM and the transparent polyimide layer 308.

Formed between the substrate 311 and the transparent substrate 301 is the transparent polyimide layer 308 to flatten the projections and the depressions. The fluorine-based liquid layers 309a and 309b are favorably formed using Fluorinert FC40 of the 3M. In place of the fluorine-based liquid layers, fluorine polymer layers may be used. The fluorine polymer layer may be formed using Cytop of Asahi Glass Co., Ltd. These materials have a refractive index of about 1.3 and has a condition enough to suitably introduce light into a region in a substrate formed with the scattering liquid-crystal layer and the transparent polyimide layer 308 (with a refractive index of 1.5 or more) having a uniform refractive index.

The materials to form the liquid-crystal layer are, for example, a material of nematic liquid-crystal composition. The materials to form the polymer matrix precursor and the uniform-refractive-index region include materials which can constitute liquid-crystal molecules having an optical characteristic (index ellipsoid) similar to that of the material of liquid-crystal composition, for example, a mixture of methacrylate-based monomer and origomer having a side chain with composition similar to that of nematic liquid-crystal.

FIG. 25 is a plan view showing a layout of a band-shaped transparent electrodes 303 included in the scanning backlight SB1 and a scanning line driving circuit C1 for the scanning of the electrodes 303. FIG. 24 corresponds to a cross-sectional view along line XXIV—XXIV. As can be seen from FIG. 25, the scanning backlight SB1 includes n transparent electrodes 303 extending in a direction of rows. These transparent electrodes 303 are driven by the scanning line driving circuit C1.

The driving circuit C1 includes a transistor Tr having a current terminal, i.e., a drain terminal D connected to each transparent electrode 303. Another current terminal, i.e., a source terminal S of the transistor Tr is applied with a predetermined voltage. In a state in which a scanning circuit C11 applies a voltage to a control terminal, i.e., a gate electrode G of each transistor Tr to turn the transistor Tr on, when a voltage to turn the transistor off is applied to the gate terminal G of the transistor Tr connected to a particular one of the transparent electrodes 303, the voltage is not applied only to the pertinent transparent electrode 303. By sequentially changing the transistor Tr to be turned off, it is possible to sequentially scan the transparent electrode 303 to which the voltage is not applied.

In an alternative method, switches are simply disposed as in the case of the STN liquid crystal such that the switches are sequentially opened and closed for the purpose above. An opposing terminal is applied with a voltage in any situation, and (n−1) line electrodes (scanning lines) are applied with 0 V. When only a voltage of the 1/n frame is applied to one remaining line electrode, a region of the liquid-crystal layer corresponding to the electrode is not applied with an effective voltage. This region can be set as a voltage free region. The method in which the voltage V is kept applied to the opposing electrode is applicable to the case in which line electrodes are formed as well as to the case in which the driving operation of the active matrix type is employed.

Figure 26:
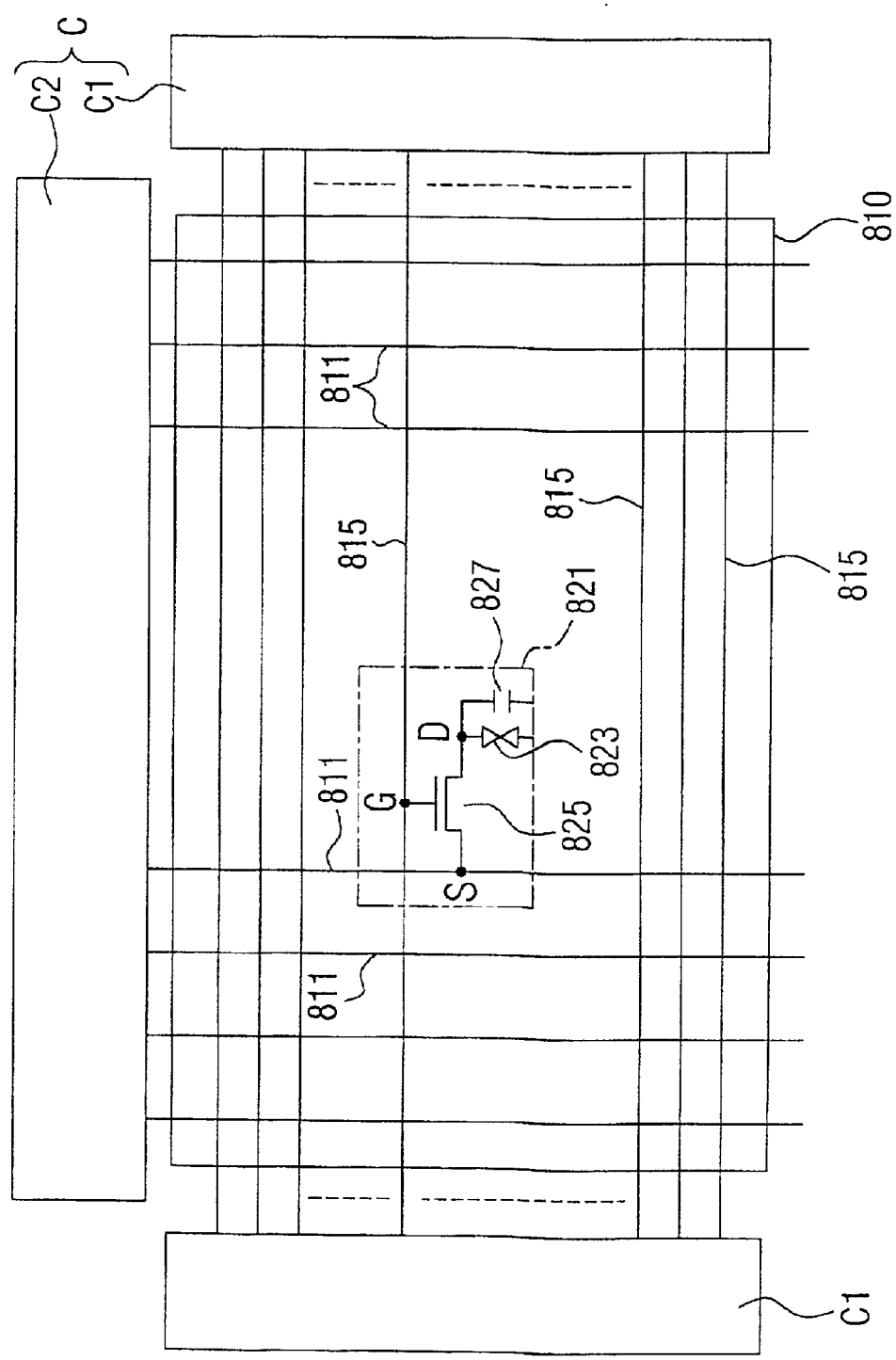
FIG. 26 is a circuit diagram showing a circuit of liquid-crystal display of active matrix type.

The display can also be used as a display of active matrix type. FIG. 26 shows in a plan view the configuration of the device shown in FIG. 24 used in a liquid-crystal display.

FIG. 26 is a diagram of an equivalent circuit schematically showing an example of a circuit configuration of an active-matrix liquid-crystal display.

The active-matrix liquid-crystal display includes a display section 810 in an elongated rectangular contour and a peripheral circuit section C including a scanning line driving circuit C1 arranged in the peripheral of the display section 810 and a signal line driving circuit C2.

Many signal lines 811 extend in an area of the display section 810 in a direction of columns. Each signal line 811 may be used to transmit color image information such as R/G/B information. Many scanning lines 815 extends in an area of the display section 810 in a direction of row. Each scanning line 815 selects pixels of a row associated therewith. At an intersection of the signal line 811 and the scanning line 815, a pixel 821 is arranged. In the overall area of the display section 810, there are disposed many pixels in a matrix. For a pixel TFT, a single-gate TFT is employed.

A source electrode S of the pixel TFT 825 is connected to the signal line 811. A gate electrode G of the pixel TFT 825 is connected to the scanning line 815. A drain electrode D of the pixel TFT 825 is connected to the liquid-crystal cell 823 and the capacitor 827 in a parallel fashion.

The capacitor 827 included in the pixel 821 receives signal charge fed via the signal line at a selection time of the associated scanning line and accumulates the signal charge up to the next selection time. The capacitor 827 is disposed when necessary. In a case in which the capacitor 827 is not disposed, when the pixel TFT 825 leaks, the voltage of the pixel electrode easily changes. The capacitor 827 is effective to keep the accumulated voltage.

Next, referring to FIG. 27, description will be given of a scanning backlight in a first variation of the fifth embodiment.

Figure 27:
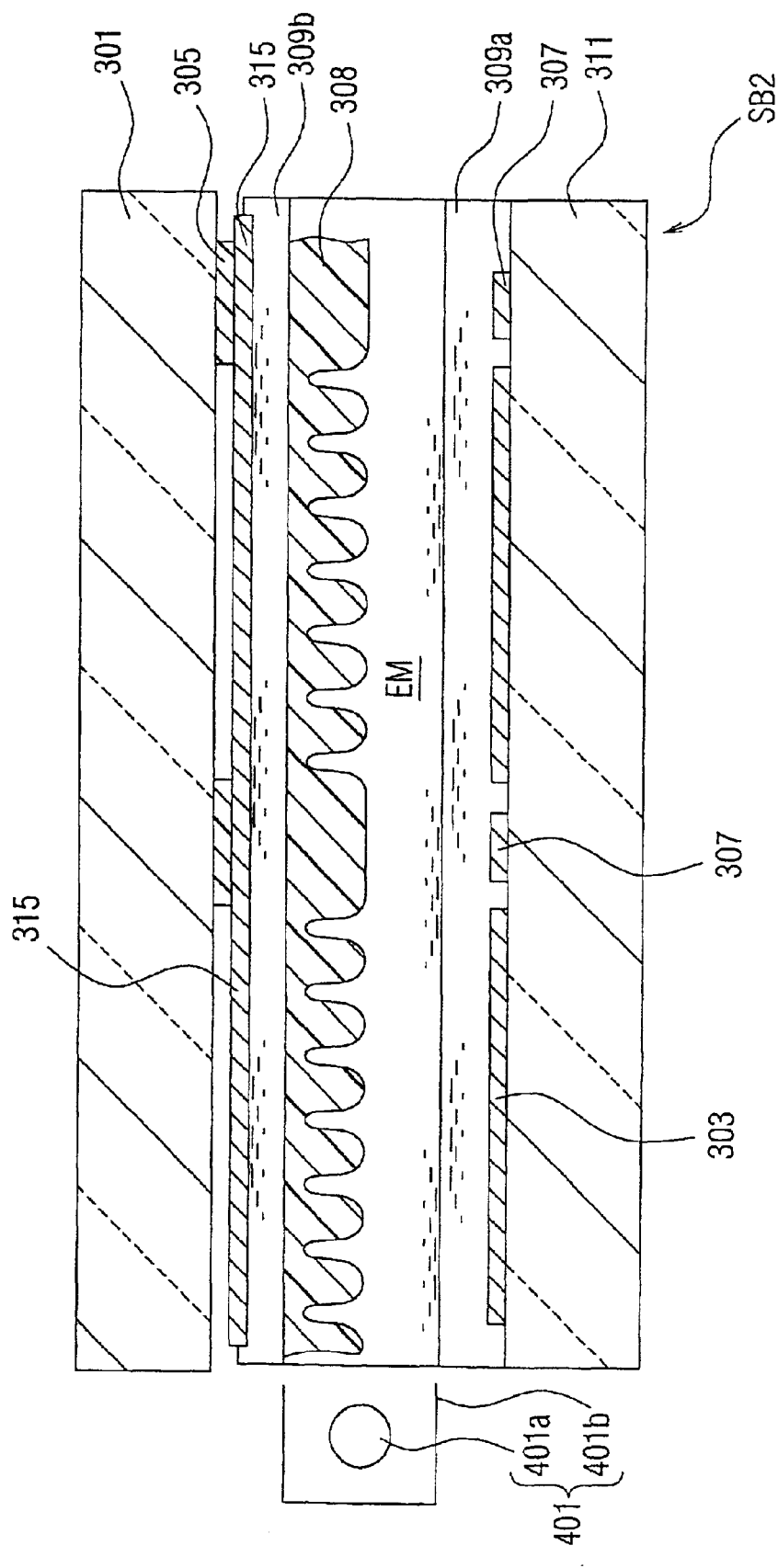
FIG. 27 is a cross-sectional view showing structure of a backlight of scan type in a variation of the fifth embodiment.

The scanning backlight SB2 of FIG. 27 differs from scanning backlight SB1 of FIG. 24 in that the backlight SB2 includes a substrate 311, a transparent electrode 303 and a bus electrode 307 which are formed on the substrate 311, and a common electrode 315 is formed on a transparent substrate 305. The other configurations of FIG. 27 are substantially the same as those of FIG. 24 and hence will not be described.

Also by using the configuration of FIG. 27, the scanning backlight and the liquid-crystal display can be constructed.

In the lighting apparatus, the light scattering state in the liquid-crystal layer can be changed between an area on which an electric field is applied and an area on which an electric field is not applied. When the light is not scattered, the light passes through the liquid-crystal layer. On the other hand, When the light is scattered in the liquid-crystal layer, the light reflects in the liquid-crystal layer.

In the liquid-crystal display, depending on presence and absence of an electric field, light passes through the liquid crystal to implement black display and the light is scattered in the liquid crystal to implement white display.

In the liquid-crystal display of PDLC type or of polarizer-combined type, it is possible to increase luminance.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. A reflective liquid-crystal display, comprising:
   a lighting apparatus, comprising:
   a light guiding plate including a flat first surface having a plurality of projections, each said projection being formed with a first inclined plane having a first angle between said plane and said flat first surface and with a second inclined plane formed adjacent to said first inclined plane with a second angle between said plane and said flat first surface, said second angle being larger than said first angle and
   a light source directly coupled to a side surface of said light guiding plate;
   a reflective liquid-crystal panel disposed on a second surface of said light guiding plate, said second surface opposing said first surface, said reflective liquid-crystal panel opposing said first surface;

a polarizer disposed between said reflective liquid-crystal panel and said light guiding plate, said polarizer being directly in contact with said reflective liquid crystal panel;

a low-refractive-index layer formed between said polarizer and said light guiding plate, said low-refractive-index layer having a refractive index smaller than a refractive index of said light guiding plate; and another low-refractive-index layer covering said plurality of projections, and having a refractive index smaller than that of the light guiding plate.

2. A reflective liquid-crystal display according to claim 1, wherein said low-refractive-index layer is formed using a fluorine-based resin or a fluorine-based liquid.

3. A reflective liquid crystal display according to claim 1, wherein said low-refractive-index layer has a refractive index of 1.2 to 1.4.

4. A reflective liquid crystal display according to claim 1, wherein said another low-refractive-index layer has a refractive index of 1.2 to 1.4.

5. A reflective liquid crystal display according to claim 1, wherein said another low-refractive-index layer is directly in contact with said low-refractive-index layer.

6. A reflective liquid crystal display according to claim 1, further comprising an optical adhesive agent layer disposed between said low-refractive-index layer and said polarizer.

* * * * *